US012762659B2

(12) United States Patent
Kobayashi

(10) Patent No.: US 12,762,659 B2
(45) Date of Patent: Oct. 13, 2026

(54) IMAGE PROCESSING APPARATUS FOR PERFORMING NOISE REDUCTION PROCESSING

(71) Applicant: CANON KABUSHIKI KAISHA, Tokyo (JP)

(72) Inventor: Tsuyoshi Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 733 days.

(21) Appl. No.: 18/058,099

(22) Filed: Nov. 22, 2022

(65) Prior Publication Data

US 2023/0162328 A1 May 25, 2023

(30) Foreign Application Priority Data

Nov. 25, 2021 (JP) ................................ 2021-191531
Nov. 25, 2021 (JP) ................................ 2021-191532

(51) Int. Cl.
*G06T 5/70* (2024.01)
*G06T 5/50* (2006.01)
*G06T 5/73* (2024.01)

(52) U.S. Cl.
CPC .................. *G06T 5/70* (2024.01); *G06T 5/50* (2013.01); *G06T 5/73* (2024.01);
(Continued)

(58) Field of Classification Search
CPC ............ G06T 2207/20081; G06T 2207/20084
See application file for complete search history.

(56) References Cited

U.S. PATENT DOCUMENTS 9,262,808 B2 * 2/2016 Porikli ...................... G06T 5/20
9,332,953 B2 * 5/2016 Suzuki ................ A61B 6/5211
(Continued)

FOREIGN PATENT DOCUMENTS

JP H08153194 A 6/1996
JP 2004294076 A * 10/2004
(Continued)

OTHER PUBLICATIONS

N. Kalyvas et al., "Modeling noise properties of a high resolution CMOS detector for X-ray digital mammography," 2011 IEEE Nuclear Science Symposium Conference Record, Valencia, Spain, 2011, pp. 2465-2470, doi: 10.1109/NSSMIC.2011.6152669. (Year: 2011).*

(Continued)

*Primary Examiner* — Gandhi Thirugnanam
(74) *Attorney, Agent, or Firm* — Canon U.S.A., Inc. IP Division

(57) ABSTRACT

An image processing apparatus includes an obtaining unit configured to obtain a first radiation image of an inspection target object that has been captured by a radiation imaging apparatus, and a generation unit configured to generate a second radiation image including noise reduced as compared with the first radiation image, by inputting the first radiation image obtained by the obtaining unit, to a learned model obtained by performing learning using learning data including a radiation image to which noise simulating system noise of a radiation imaging apparatus in accordance with a distribution that is based on a manufacturing variation of a radiation imaging apparatus is added.

10 Claims, 14 Drawing Sheets

(52) U.S. Cl.
CPC ............... *G06T 2207/10121* (2013.01); *G06T 2207/20081* (2013.01); *G06T 2207/20216* (2013.01); *G06T 2207/30148* (2013.01)

(56) References Cited

U.S. PATENT DOCUMENTS

| | | | | |
|---|---|---|---|---|
| 10,945,695 | B2 * | 3/2021 | Zhou | G06N 3/045 |
| 10,949,951 | B2 * | 3/2021 | Tang | G06T 5/70 |
| 11,195,310 | B2 * | 12/2021 | Fu | G06N 3/084 |
| 11,554,272 | B2 * | 1/2023 | Sun | G16H 50/70 |
| 12,499,517 | B2 * | 12/2025 | Kobayashi | A61B 6/5258 |
| 2007/0286336 | A1 * | 12/2007 | Bernard | G06T 7/0012 378/62 |
| 2007/0286470 | A1 * | 12/2007 | Bernard | G06T 7/0012 382/154 |
| 2018/0018757 | A1 * | 1/2018 | Suzuki | G06N 3/045 |
| 2022/0386977 | A1 * | 12/2022 | Baumgart | A61B 6/5258 |
| 2023/0162328 | A1 * | 5/2023 | Kobayashi | G06T 5/70 382/155 |
| 2023/0206404 | A1 * | 6/2023 | Kobayashi | A61B 6/4233 382/100 |

FOREIGN PATENT DOCUMENTS

| | | | | | |
|---|---|---|---|---|---|
| JP | 2006080852 | A | | 3/2006 | |
| JP | 2007189589 | A | | 7/2007 | |
| JP | 4164914 | B2 | * | 10/2008 | |
| JP | 4679710 | B2 | * | 4/2011 | |
| JP | 2017148125 | A | * | 8/2017 | G06T 7/13 |
| JP | 2018206382 | A | | 12/2018 | |
| JP | 2020166814 | A | | 10/2020 | |
| JP | 2021060847 | A | | 4/2021 | |
| JP | 2022039989 | A | * | 3/2022 | |
| WO | WO-2019240257 | A1 | * | 12/2019 | G06N 3/044 |
| WO | WO-2022045210 | A1 | * | 3/2022 | A61B 6/5258 |
| WO | WO-2022051199 | A1 | * | 3/2022 | G06T 11/006 |

OTHER PUBLICATIONS

Zhang D, Rong J, Chen WR, Gao F, Xu K, Wu X, Liu H. Impact of additive noise on system performance of a digital X-ray imaging system. IEEE Trans Biomed Eng. Jan. 2007;54(1):69-73. doi: 10.1109/TBME.2006.884643. (Year: 2007).*

P Monnin, H Bosmans, F R Verdun and N W Marshall, A comprehensive model for quantum noise characterization in digital mammography, Physics in Medicine & Biology, vol. 61, No. 5, Feb. 19, 2016 (Year: 2016).*

Riko Radojcic and Yanfeng Li, Design For Noise (DfN), 2017, https://semiengineering.com/design-for-noise-dfn/ (Year: 2017).*

* cited by examiner

IMAGE PROCESSING APPARATUS FOR PERFORMING NOISE REDUCTION PROCESSING

BACKGROUND OF THE INVENTION

Field of the Invention

The present invention relates to an image processing apparatus.

Description of the Related Art

In recent years, radiation detectors including detection units for detecting radiation such as X-rays have been widely used in fields such as an industrial field and a medical field. In particular, digital radiography (DR) apparatuses for capturing radiation images using semiconductor sensors have been widely diffused.

In such a DR apparatus, it is general to perform various types of image processing for enhancing image quality of captured images. As one type of image processing, noise reduction processing for enhancing visibility of a diagnosis domain by improving the granularity of a captured image has been performed. Noise reduction processing to which a machine learning technique such as deep learning is applied especially has a possibility of great improvement in granularity. As a prior art, there has been proposed a technique of obtaining a good noise reduction effect by performing supervised learning using sets of images to which noise estimated from the noise characteristic of an imaging apparatus is added.

SUMMARY OF THE INVENTION

According to an aspect of the present invention, an image processing apparatus includes an obtaining unit configured to obtain a first radiation image of an inspection target object that has been captured by a radiation imaging apparatus, and a generation unit configured to generate a second radiation image including noise reduced as compared with the first radiation image, by inputting the first radiation image obtained by the obtaining unit, to a learned model obtained by performing learning using learning data including a radiation image to which noise simulating system noise of a radiation imaging apparatus in accordance with a distribution that is based on a manufacturing variation of a radiation imaging apparatus is added.

Further features of the present invention will become apparent from the following description of exemplary embodiments with reference to the attached drawings.

DESCRIPTION OF THE EMBODIMENTS

Figure 1A:
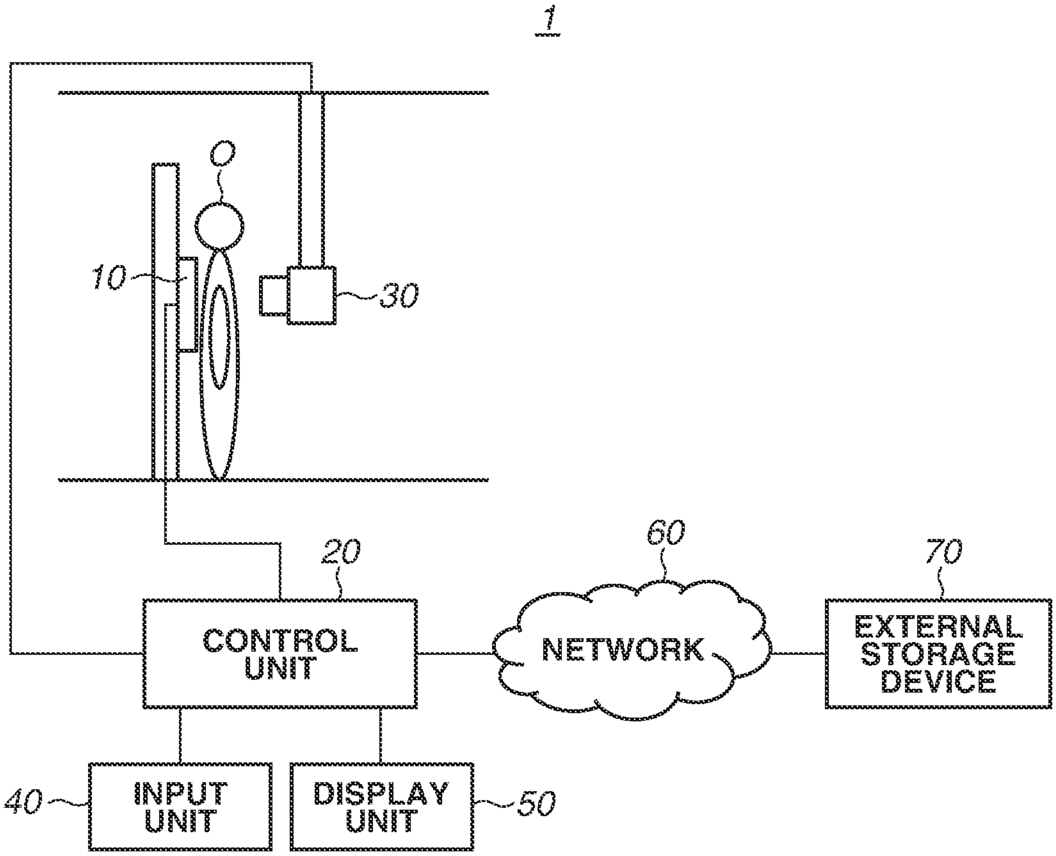
FIG. 1A is a diagram illustrating an example of a schematic configuration of a radiography system according to a first exemplary embodiment.

Hereinafter, exemplary embodiments of the present invention will be described in detail with reference to the drawings. The dimensions, materials, shapes, and relative positions of components to be described in the following exemplary embodiments can be arbitrarily determined, and can be changed in accordance with the configuration of an apparatus to which the present invention is applied, or various conditions. The same reference numerals are used throughout the drawings to denote equivalent or functionally-similar components.

In the exemplary embodiments of the present disclosure to be described below, radiation includes α-rays, β-rays, and γ-rays, which are beams created by particles (including photons) emitted by radioactive decay. The radiation further includes X-rays, particle rays, and cosmic rays, for example, which are beams having equivalent energy or higher energy. Hereinafter, dark current and electric noise that do not depend on the signal level of a radiation image will be referred to as system noise.

Hereinafter, a machine learning model refers to a learning model that is based on a machine learning algorithm. Specific algorithms of machine learning include a nearest neighbor algorithm, a Naive Bayes algorithm, a decision tree, and a support vector machine. In addition, a neural network and deep learning may be used. Among the above-described algorithms, an available algorithm can be appropriately applied to the following exemplary embodiments and modified examples. In addition, learning data refers to a data set to be used in learning of a machine learning model. The learning data includes a pair of input data to be input to the machine learning model, and ground truth, which serves as correct solution to be output from the machine learning model.

A learned model refers to a model obtained by preliminarily performing learning using appropriate learning data for a machine learning model following an arbitrary machine learning algorithm such as deep learning. Although the learned model is obtained by preliminarily performing learning using appropriate learning data, the learned model does not exclude the possibility of farther learning, and additional learning can also be performed. The additional learning can be performed even after an apparatus is installed in a usage location.

A first exemplary embodiment will be described. When industrial products are mass-produced, the prior art cannot avoid the occurrence of a manufacturing variation among component parts such as image sensors, lenses, or fluorescent members, for example, or the assembly accuracy of parts, and an individual difference is inevitably generated in resolution, sensitivity, or noise characteristic.

For this reason, when a machine learning technique of this type is applied to industrial products that are to be mass-produced, the characteristics of products from which data used in the learning has been generated, and the characteristics of products from which data to be subjected to image processing in inference has been generated sometimes fail to be consistent. In other words, the characteristics of a learning system used in learning and the characteristics of an inference system to be used after products are shipped as industrial products do not match, and this sometimes disables desirable image processing. In noise reduction processing, for example, an effect of noise reduction might deteriorate, or a failure such as the generation of artifact might occur in an inference result.

The present invention has been devised in view of the above-described drawbacks, and the present invention is directed to applying desirable image processing to an image.

The object of the present invention is not limited to the above-described object. As one of other objects, the present invention is directed to the production of functional effects that are to be derived from configurations to be described below in the following exemplary embodiments, which cannot be obtained by the prior art.

(Configuration of Radiography System)

Hereinafter, a radiography system according to the first exemplary embodiment of the present disclosure will be described with reference to FIGS. 1A and 1B. FIG. 1A illustrates a schematic configuration of a radiography system 1 according to the present exemplary embodiment. The following description will be given assuming that an inspection target object O is a human body. Nevertheless, the inspection target object O to be subjected to image capturing performed by a radiography system according to an exemplary embodiment of the present disclosure is not limited to a human body, and may be any of another animal or plant, and a target object of a nondestructive inspection. The following description will be given using the radiography system 1 illustrated in FIG. 1A, as an example. Alternatively, an imaging apparatus that captures images of the inspection target object O may be a magnetic resonance imaging (MRI) apparatus, an X-ray computed tomography (CT) apparatus, a three-dimensional ultrasonic imaging apparatus, a photoacoustic tomography apparatus, a positron emission tomography/single photon emission computed tomography (PET/SPECT) apparatus, an optical coherence tomography (OCT) apparatus, or an optical camera. In other words, a series of processes according to the present exemplary embodiment may be applied not only to radiation images but also to other medical images and optical images.

The radiography system 1 according to the present exemplary embodiment are provided with a radiation detector 10, a control unit 20, a radiation generator 30, an input unit 40, and a display unit 50. The radiography system 1 may include an external storage device 70 such as a server that is connected to the control unit 20 via a network 60 such as the Internet or an intranet.

The radiation generator 30 includes a radiation generation source such as an X-ray tube, and can emit radiation. The radiation detector 10 can detect radiation emitted by the radiation generator 30, and can generate a radiation image in accordance with the detected radiation. The radiation detector 10 can accordingly generate a radiation image of the inspection target object O by detecting radiation having been emitted by the radiation generator 30 and passed through the inspection target object O. In the present disclosure, states of images include not only a state of being displayed on a display unit, but also a state of being stored in a database or a storage unit as image data.

Figure 1B:
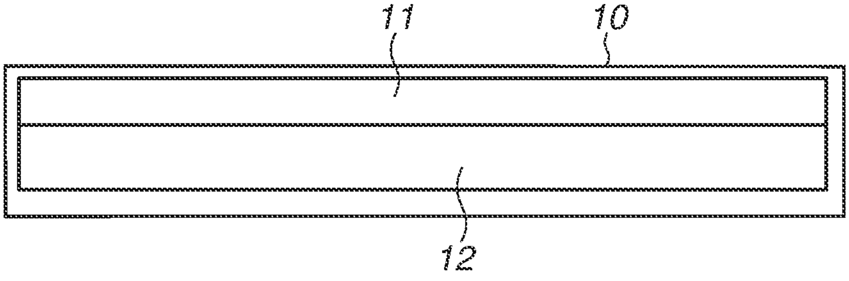
FIG. 1B is a diagram illustrating an example of a schematic configuration of a radiation detector according to the first exemplary embodiment.

FIG. 1B illustrates a schematic configuration of the radiation detector 10 according to the present exemplary embodiment. The radiation detector 10 is provided with a fluorescent member 11 and an image sensor 12. The fluorescent member 11 converts radiation incident upon the radiation detector 10 into light with a wavelength detectable by the image sensor 12.

The fluorescent member 11 may include cesium iodide (CsI) or $Gd_2O_2S$ (GOS), for example. The image sensor 12 includes photoelectric conversion elements containing amorphous silicon (a-Si) or crystalline Si, for example. The image sensor 12 can detect light corresponding to radiation that has been converted by the fluorescent member 11, and output a signal corresponding to the detected light. The radiation detector 10 can generate a radiation image by performing analog-to-digital (A/D) conversion of the signal output by the image sensor 12. The radiation detector 10 may include a calculation unit and an A/D converter, which are not illustrated in FIG. 1B.

The control unit 20 is connected to the radiation detector 10, the radiation generator 30, the input unit 40, and the display unit 50. The control unit 20 can perform image processing on a radiation image output and obtained from the radiation detector 10, and control the driving of the radiation detector 10 and the radiation generator 30. Thus, the control unit 20 can function as an example of an image processing apparatus. The control unit 20 may also be connected to the external storage device 70 via the arbitrary network 60 such as the Internet or an intranet, and may obtain radiation images from the external storage device 70. Furthermore, the control unit 20 may be connected with another radiation detector or another radiation generator via the network 60. The control unit 20 may be connected to the external storage device 70 wirelessly or via a cable.

The input unit 40 includes an input device such as a mouse, a keyboard, a trackball, or a touch panel, and can input an instruction to the control unit 20 by being operated by an operator. The display unit 50 includes an arbitrary monitor, for example, and can display information and images output from the control unit 20, and information input by the input unit 40.

In the present exemplary embodiment, the control unit 20, the input unit 40, and the display unit 50 are separate devices, but these units may be integrally formed. For example, the input unit 40 and the display unit 50 may be formed as a touch panel display. In the present exemplary embodiment, an image processing apparatus includes the control unit 20, but the image processing apparatus is only required to be able to obtain a radiation image and perform image processing on the radiation image, and needs not control the driving of the radiation detector 10 and the radiation generator 30.

The control unit 20, the radiation detector 10, and the radiation generator 30 may be connected wirelessly or via a cable. Furthermore, the external storage device 70 may be included in an image system such as a picture archiving and communication system (PACS) installed in a hospital, or may be a server installed outside a hospital.

(Configuration of Control Unit)

Figure 2A:
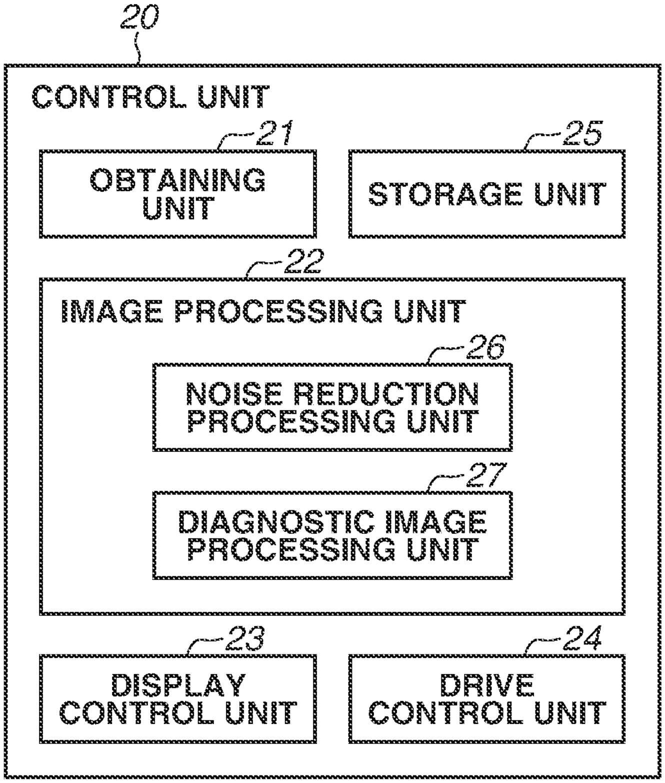
FIG. 2A is a diagram illustrating an example of a schematic configuration of a control unit according to the first exemplary embodiment.
Figure 2B:
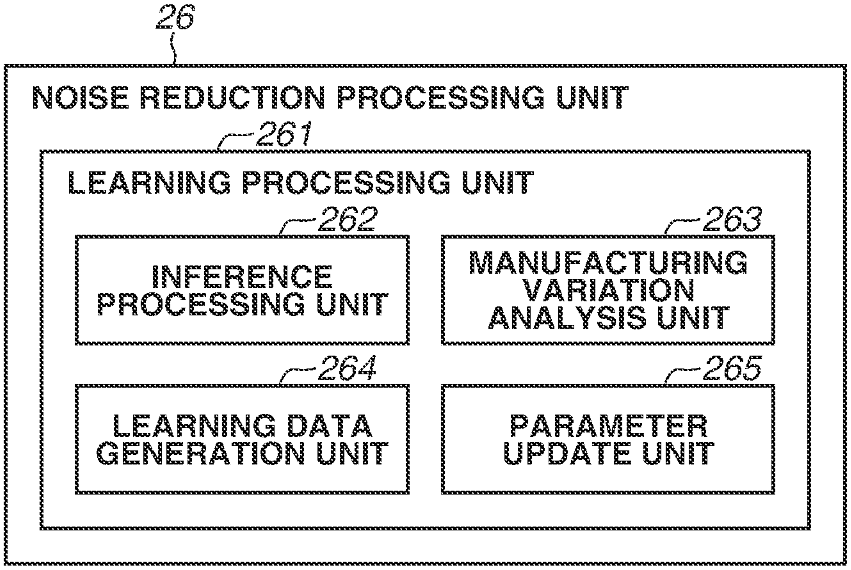
FIG. 2B is a diagram illustrating an example of a schematic configuration of a noise reduction processing unit according to the first exemplary embodiment.

Next, a specific configuration of the control unit 20 (radiation image processing apparatus) will be described with reference to FIGS. 2A and 2B. FIGS. 2A and 2B illustrate a schematic configuration of the control unit 20 according to the present exemplary embodiment. The control unit 20 is provided with an obtaining unit 21, an image processing unit 22, a display control unit 23, a drive control unit 24, and a storage unit 25.

The obtaining unit 21 can obtain radiation images output by the radiation detector 10, and various types of information input by the input unit 40. The obtaining unit 21 can also obtain radiation images and patient information from the external storage device 70. In other words, the obtaining unit 21 can obtain radiation images of an inspection target object that have been captured by a radiation imaging apparatus.

The image processing unit 22 includes a noise reduction processing unit 26 and a diagnostic image processing unit 27, and can perform image processing according to an exemplary embodiment of the present disclosure on radiation images obtained by the obtaining unit 21. The noise reduction processing unit 26 includes a learning processing unit 261 and an inference processing unit 262. In addition to the configuration of the inference processing unit 262, the learning processing unit 261 is further provided with a manufacturing variation analysis unit 263, a learning data generation unit 264, and a parameter update unit 265. With this configuration, the noise reduction processing unit 26 can perform learning of a machine learning model for performing noise reduction processing, and apply desirable noise reduction processing to radiation images using the machine learning model. The diagnostic image processing unit 27 can perform diagnostic image processing for conversion into an image suitable for diagnosis, on an image having been subjected to noise reduction executed by the noise reduction processing unit 26. Examples of the diagnostic image processing include gradation processing, enhancement processing, and grid pattern reduction processing.

Next, the configuration of the learning processing unit 261 will be described.

The learning processing unit 261 performs learning processing to be applied in learning of a machine learning model. In addition to the configuration of the inference processing unit 262, the learning processing unit 261 further includes the learning data generation unit 264 and the parameter update unit 265.

In performing learning processing, an image is input to the learning processing unit 261, and learning data is generated by the learning data generation unit 264.

The description will be given of a configuration example in which an image including added artificial noise is used as input data and an image not including added artificial noise is used as ground truth, as a set of learning data for learning noise reduction processing.

By adding artificial noise created with simulation of the features of a radiation image, to an input image, processing of generating a set of data for learning is performed. The noise to be added by the learning data generation unit 264 reflects a noise amount that can vary due to a manufacturing variation calculated by the manufacturing variation analysis unit 263. The details of artificial noise to be added will be described below.

The parameter update unit 265 performs processing of updating parameters of a machine learning model that are stored in the inference processing unit 262, based on a calculation result of the inference processing unit 262 and ground truth.

The learning processing unit 261 needs not be always included in a radiography system. For example, the learning processing unit 261 may be provided on hardware different from the radiography system. Then, by preliminarily performing learning using appropriate learning data, a learned model may be created, and the radiography system may perform only processing involving the inference processing unit 262. Alternatively, by including the learning processing unit 261 in the radiography system, additional learning may be enabled to be performed using learning data obtained after installation.

The display control unit 23 can control the display on the display unit 50. The display control unit 23 can display, on the display unit 50, radiation images obtained before and after image processing executed by the image processing unit 22, and patient information. The drive control unit 24 can control the driving of the radiation detector 10 and the radiation generator 30. The control unit 20 can therefore control capturing of radiation images by controlling driving properties of the radiation detector 10 and the radiation generator 30 using the drive control unit 24.

The storage unit 25 can store an operating system (OS), a device driver of a peripheral device, and programs for implementing various types of application software including programs for performing processing to be described below. The storage unit 25 can also store information obtained by the obtaining unit 21, and radiation images processed by the image processing unit 22. For example, the storage unit 25 can store radiation images obtained by the obtaining unit 21, and radiation images having been subjected to noise reduction processing to be described below.

While the control unit 20 can be formed using a general-purpose computer including a processor and a memory, the control unit 20 may be formed as a computer dedicated for the radiography system 1. The control unit 20 functions as an example of an image processing apparatus according to the present exemplary embodiment, but the image processing apparatus according to the present exemplary embodiment may be a separate (external) computer connected to the control unit 20 in such a manner that communication can be performed. As the control unit 20 or the image processing apparatus, for example, a personal computer (PC) may be used, and a desktop PC, a laptop PC, or a tablet PC (portable information terminal) may be used. The processor may be a central processing unit (CPU). Alternatively, the processor may be a micro processing unit (MPU), a graphical processing unit (GPU), or a field-programmable gate array (FPGA), for example.

Each function of the control unit 20 may be implemented by a processor such as a CPU or an MPU executing a software module stored in the storage unit 25. The processor may be a GPU or an FPGA, for example. In addition, each function may be implemented by a circuit having a specific function, such as an application specific integrated circuit (ASIC). For example, the image processing unit 22 may be implemented by dedicated hardware such as an ASIC, or the display control unit 23 may be implemented using a dedicated processor such as a GPU that is different from a CPU. The storage unit 25 may include an arbitrary storage medium such as a hard disk, an optical disk, or a memory.

(Configuration of Machine Learning Model)

Next, an example of a machine learning model constituting a learned model according to the present exemplary embodiment will be described with reference to FIGS. 3A, 3B, and 3C. As an example of a machine learning model, the inference processing unit 262 according to the present exemplary embodiment uses a multilayer neural network.

Figure 3A:
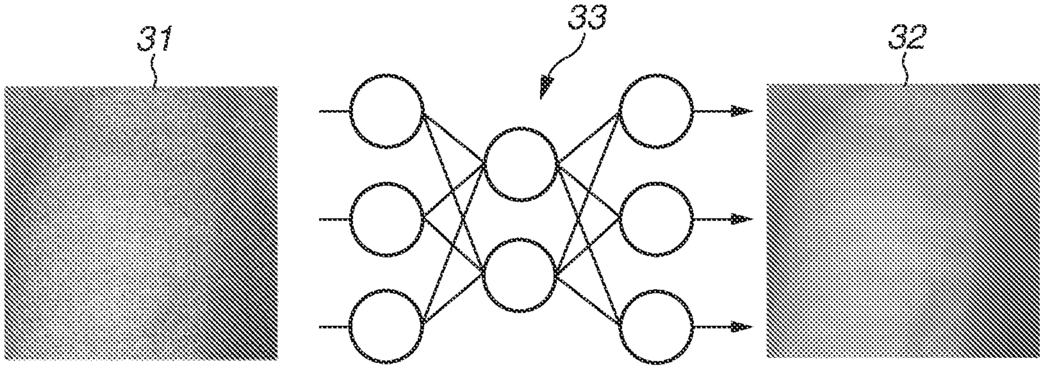
FIG. 3A is a diagram illustrating an example of a schematic configuration of a learned model according to the first exemplary embodiment.

FIG. 3A illustrates a schematic configuration example of a neural network model according to the present exemplary embodiment. A neural network model 33 illustrated in FIG. 3A is designed to output inference data (inference image) 32 including reduced noise, based on input data (radiation image) 31, in accordance with a preliminarily-learned tendency. An output radiation image including reduced noise is based on learning executed in a machine learning process, and the neural network according to the present exemplary embodiment learns feature amounts for sorting signals and noise included in the radiation image.

In at least part of the multilayer neural network, for example, a convolutional neural network (hereinafter, will be referred to as CNN) can be used. Alternatively, a technique related to an auto-encoder may be used in at least part of the multilayer neural network.

The description will be given of a case where a CNN is used as a machine learning model for noise reduction processing of radiation images. FIG. 3B illustrates an example of a schematic configuration 33 of a CNN included in the neural network model according to the present exemplary embodiment. In the example of a learned model according to the present exemplary embodiment, if the input data (radiation image) 31 is input, the inference data (inference image) 32 including reduced noise can be output.

Figure 3B:
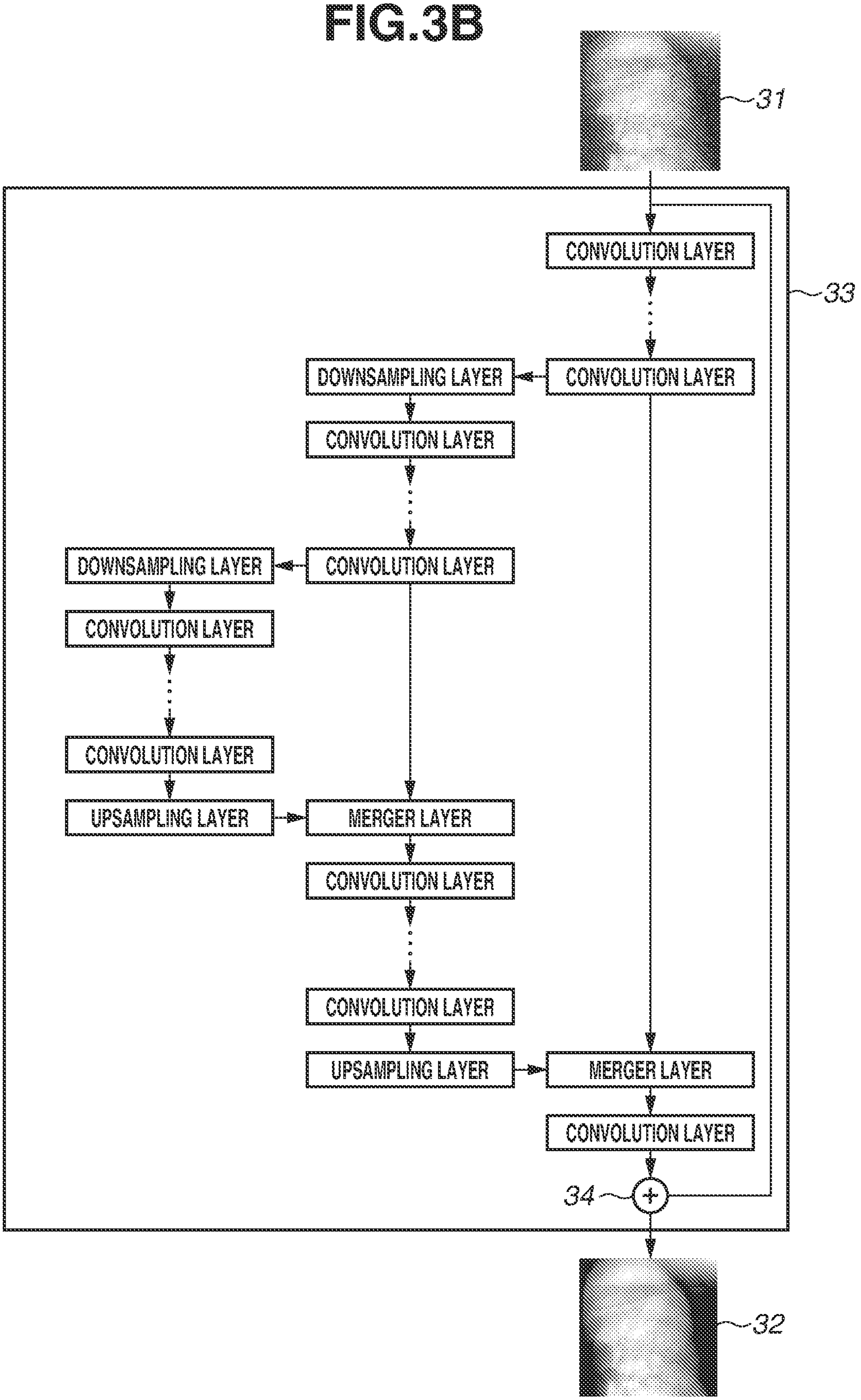
FIG. 3B is a diagram illustrating an example of a schematic configuration of a learned model according to the first exemplary embodiment.
Figure 3C:
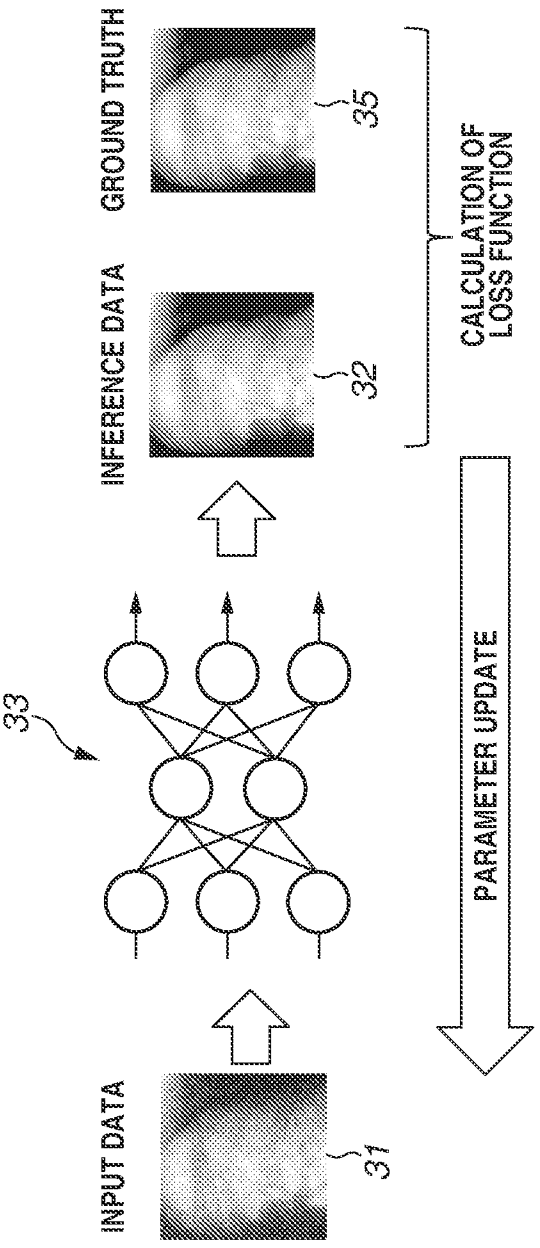
FIG. 3C is a diagram illustrating an operation example of learning processing according to the first exemplary embodiment.

The CNN illustrated in FIG. 3B includes a plurality of layer groups having a function of processing an input value group and outputting the input value group. The types of layers included in the configuration 33 of the CNN include a convolution layer, a downsampling layer, an upsampling layer, and a merger layer. A layer 34 is an addition layer. A shortcut of adding input data before output is desirably allocated to the layer 34. The CNN can thereby be configured to learn a difference between input data and output data, and a system targeting noise can be desirably handled.

The convolution layer is a layer that performs convolution processing on an input value group in accordance with parameters such as a kernel size of a set filter, the number of filters, a value of stride, and a value of dilatation. A dimension number of a kernel size of the filter may be changed in accordance with a dimension number of an input image.

The downsampling layer is a layer that performs processing of making the number of output value groups smaller than the number of input value groups by thinning out or merging input value groups. Specifically, for example, such processing includes Max Pooling processing.

The upsampling layer is a layer that performs processing of making the number of output value groups larger than the number of input value groups by duplicating an input value group, or adding a value interpolated from an input value group.

Specifically, for example, such processing includes upsampling processing that uses deconvolution.

The merger layer is a layer that performs processing of inputting value groups such as an output value group of a certain layer or a pixel value group constituting an image, from a plurality of sources, and merging the value groups by connecting or adding them.

It should be noted that, if the setting of parameters for layer groups or node groups included in a neural network differs, a reproducible level in inference of tendency trained from learning data sometimes differs. That is, because appropriate parameters differ in accordance with an embodying configuration in many cases, values can be changed to desirable values as necessary.

In some cases, the CNN can obtain better characteristics by changing the configuration of the CNN, in addition to the above-described method of changing parameters. The better characteristics refer to characteristics of outputting a radiation image including reduced noise, more accurately, shortening a processing time, and shortening a time taken for the training of a machine learning model, for example.

The schematic configuration 33 of the CNN to be used in a modified example is a U-net machine learning model having a function of an encoder including a plurality of hierarchies including a plurality of downsampling layers, and a function of a decoder including a plurality of hierarchies including a plurality of upsampling layers. The U-net machine learning model has a configuration in which position information (space information) obscured in a plurality of hierarchies formed as an encoder can be used in the same hierarchy (corresponding hierarchy) in a plurality of hierarchies formed as a decoder (for example, using skip connection).

As a change example of the configuration of the CNN, which is not illustrated, for example, layers of an activating function (for example, Rectifier Linear Unit (ReLu)) may be added prior to and posterior to the convolution layer, and layers for performing various types of normalization processing such as batch normalization may be further added prior to and posterior to the layers.

Through these steps of CNN, features of noise can be extracted from an input radiation image.

In this example, the learning processing unit 261 includes the parameter update unit 265. As illustrated in FIG. 3C, the parameter update unit 265 performs processing of calculating a loss function from ground truth 35 in learning data and the inference data (inference image) 32 obtained by applying the schematic configuration 33 of the CNN of the inference processing unit 262 to the input data (radiation image) 31 in learning data, and updating parameters of the schematic configuration 33 of the CNN based on the loss function. The loss function represents a difference between the inference data (inference image) 32 and the ground truth 35.

The parameter update unit 265 updates a filter coefficient of the convolution layer using backpropagation, for example, in such a manner as to reduce a difference between the inference data (inference image) 32 and the ground truth 35 that is represented by the loss function. The backpropagation is a method of adjusting parameters of nodes of the neural network in such a manner as to reduce the above-described difference.

The learning may use a method of inactivating (dropout), at random, units (neurons or node) included in the CNN.

Furthermore, a learned model used by the inference processing unit 262 may be a learned model generated using transfer learning. In this case, for example, a learned model to be used in noise reduction processing may be generated by performing transfer learning of a machine learning model learned using a radiation image of an inspection target object O different in type. By performing such transfer learning, it is possible to efficiently generate a learned model for an inspection target object O for which it is difficult to collect a large number of learning data. The inspection target object O different in type may be an animal, plant, or a target object of nondestructive inspection, for example.

By performing parallel processing of a larger amount of data, a GPU can perform efficient calculation. Thus, in the case of performing learning a plurality of times using a learning model obtained using the above-described CNN, it is effective to perform processing by the GPU. In view of the foregoing, the learning processing unit 261 according to the present exemplary embodiment uses a GPU in addition to a CPU. Specifically, in the case of executing a learning program including a learning model, learning is performed by the CPU and the GPU performing calculation in cooperation. In the learning processing, calculation may be performed only by the CPU or the GPU. Each piece of processing in the inference processing unit 262 may also be executed using the GPU similarly to the learning processing unit 261.

Heretofore, the configuration of the machine learning model has been described, but the machine learning model is not limited to the model that uses the CNN described so far. The machine learning may be any machine learning similar to machine learning executed using a model that can extract (represent) a feature amount of learning data such as an image, by learning.

(Learning Processing)

Next, a flow of processing to be executed by the learning processing unit 261 (learning unit) according to the present exemplary embodiment will be described.

As a set of learning data to be used in the learning processing unit 261, an image including added artificial noise and an image not including added artificial noise are used as input data and ground truth for learning noise reduction processing, and a radiography image in the medical field will be described as an example of a target image.

It is desirable to use, as learning data, a set of a radiation image including noise and serving as input data, and a radiation image substantially not including noise and serving as ground truth. Nevertheless, it is actually difficult to prepare such learning data because it is necessary to perform image capturing using as low-dose radiation as possible in consideration of the invasiveness of radiography.

For this reason, in the present exemplary embodiment, a radiation image of a human body that has been captured for a medical purpose is used as ground truth of learning data, and an image obtained by adding artificial noise equivalent to noise generated in a radiation image to the radiation image is used as input data of learning data. By performing learning using such learning data, image features of radiation images and features of artificial noise can be learned.

In view of the foregoing, a flow of processing to be executed by the learning processing unit 261 according to the present exemplary embodiment will be described with reference to FIGS. 4 to 7.

Figure 4:
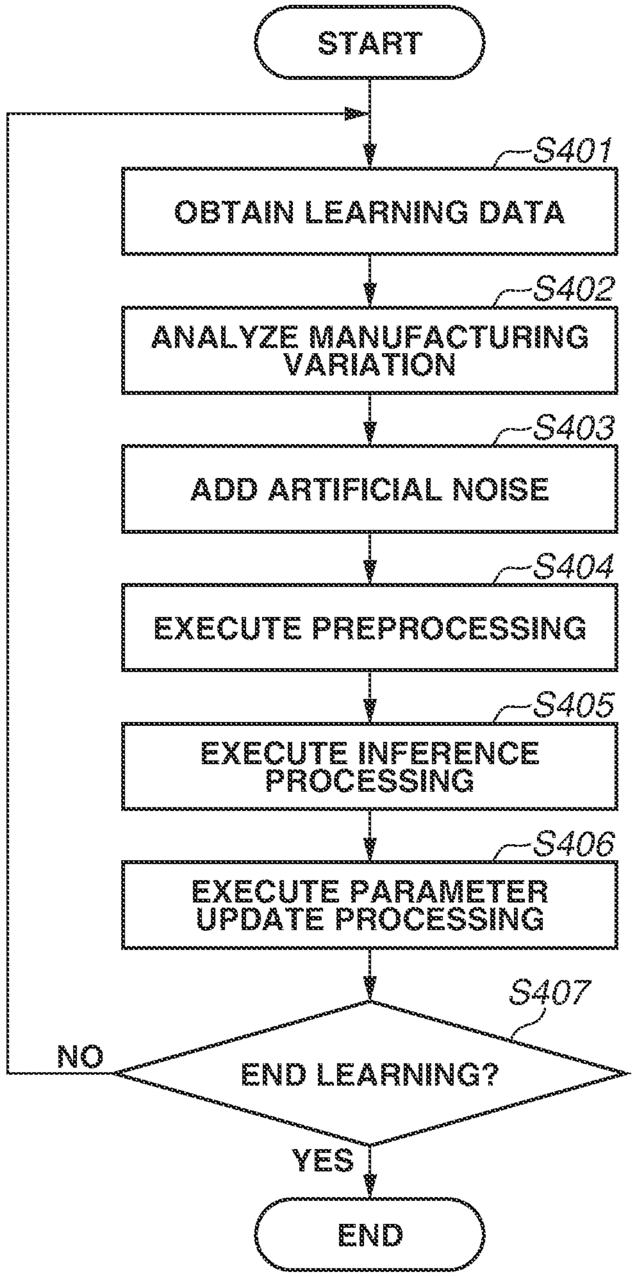
FIG. 4 is a flowchart illustrating an example of learning processing according to the first exemplary embodiment.

FIG. 4 is a flowchart illustrating a flow of processing to be executed by the learning processing unit 261 according to the present exemplary embodiment.

In step S401, learning data is input to the learning processing unit 261. The obtaining of the input learning data is performed by the obtaining unit 21. In the present exemplary embodiment, an appropriate radiation image is obtained as learning data. The obtaining unit 21 may obtain a radiation image stored in the storage unit 25, or may obtain a radiation image from the external storage device 70. Alternatively, the obtaining unit 21 may obtain a radiation image output by the radiation detector 10. The learning data in the present exemplary embodiment includes the above-described radiation images as input data and ground truth. After the above-described radiation images are input to the learning processing unit 261 as the same data, appropriate artificial noise is added to input data or input data and ground truth in the learning processing unit 261. A difference is thereby generated between the input data and the ground truth.

In step S402, the manufacturing variation analysis unit 263 performs the analysis of a manufacturing variation of the radiation detector 10. In this step, the manufacturing variation analysis unit 263 performs processing of calculating the influence of a manufacturing variation by analyzing a manufacturing variation affecting the artificial noise to be added in step S403. In other words, the manufacturing variation analysis unit 263 analyzes a manufacturing variation of noise-related characteristics of the radiation imaging apparatus. The noise-related characteristics of the radiation imaging apparatus include a system noise characteristic of the radiation imaging apparatus, sensitivity of the radiation imaging apparatus, and a characteristic of a modulation transfer function (MTF) of a fluorescent member included in the radiation imaging apparatus, for example. Then, the manufacturing variation analysis unit 263 can analyze a manufacturing variation for at least one of these. The above-described noise-related characteristics are examples, and noise-related characteristics are not limited to these as long as the characteristics are variables affecting artificial noise.

Noise included in radiation images is broadly divided into quantum noise mainly generated due to a fluctuation of radiation quanta and system noise generated from a detector and a circuit. Because the radiation detector 10 has a configuration of converting radiation into visible light using the fluorescent member 11, it is known that high-frequency attenuation occurs in a signal of radiation in accordance with an MTF defined by the resolution of the fluorescent member 11. In quantum noise generated due to a fluctuation of radiation quanta, high-frequency attenuation occurs in accordance with a similar MTF. In other words, quantum noise corresponds to an example of noise in which high-frequency components have attenuated. On the other hand, system noise generated from a detector and a circuit is not affected by the fluorescent member 11. Noise included in a radiation image is obtained by adding system noise independent of a dose in image capturing and quantum noise varying depending on a dose in image capturing. In other words, in the present exemplary embodiment, noise simulating system noise and noise including high-frequency components attenuated, in accordance with a distribution based on a manufacturing variation of a radiation imaging apparatus, are generated and added to a radiation image.

In view of the foregoing, in the present exemplary embodiment, noise obtaining by combining white noise corresponding to system noise of the radiation detector 10 and quantum noise affected by the MTF of the fluorescent member 11 is treated as artificial noise.

As for a combined ratio of quantum noise and system noise, it is desirable to simulate the characteristics of the radiation detector 10 using relational expressions of the following equations (1) to (4), for example.

A variance $\sigma_{all}^2$ of noise in a radiation image satisfies the relation of equation (1), $$\sigma_{all}^2=\sigma_q^2+\sigma_s^2 \quad (1),$$

where $\sigma_q$ denotes a standard deviation of quantum noise and as denotes a standard deviation of system noise generated by the radiation detector 10. Further, equation (2) holds, $$\sigma_q^2=q^2\times I_{sig} \quad (2),$$

where $I_{sig}$ denotes a signal of an input image and q denotes a coefficient of quantum noise, and the standard deviation $\sigma_q$ of quantum noise being proportional to the signal $I_{sig}$. Further, equation (3) holds, $$\sigma_s^2=s^2 \quad (3),$$

where s denotes a coefficient of system noise, and the standard deviation as of system noise being a fixed value unproportional to the signal $I_{sig}$.

In view of the foregoing, artificial noise (addNoise) can be obtained as follows. First, artificial system noise sNoise simulating system noise is set to additive white gaussian noise (AWGN) with the standard deviation as. Next, artificial quantum noise qNoise simulating quantum noise is set to noise having a noise power spectrum (NPS) following a Poisson distribution with the variance $\sigma_q^2$ and following the MTF of the fluorescent member 11. For example, when fMTF denotes an MTF approximated to the MTF of the fluorescent member 11 using a two-dimensional filter, it is desirable to create artificial noise by convoluting fMTF into a noise image following the Poisson distribution. Because the Poisson distribution can be approximated to a normal distribution when a variance is large enough, the artificial quantum noise qNoise may be treated as noise following a normal distribution. At this time, the artificial noise (addNoise) can be expressed as $$\text{addNoise}=A\times(\text{sNoise}+\text{qNoise}) \quad (4)$$

At this time, A denotes an arbitrary coefficient and it is normally desirable to set A=1, but in a case where a noise reduction effect is desired to be changed, it is possible to adjust a noise addition amount by varying the coefficient A.

It is experimentally known that a distribution of noise generated in a radiation image approximates a normal distribution in which an average value and a median value are almost 0. A distribution of artificial noise obtained as described above can also be regarded as a distribution in which an average value and a median value are almost 0.

In consideration of the above-described system, due to the influence of a manufacturing variation, an individual difference is generated in the radiation detector 10 mainly in system noise, sensitivity, and the characteristic of an MTF of a fluorescent member.

Figure 5:
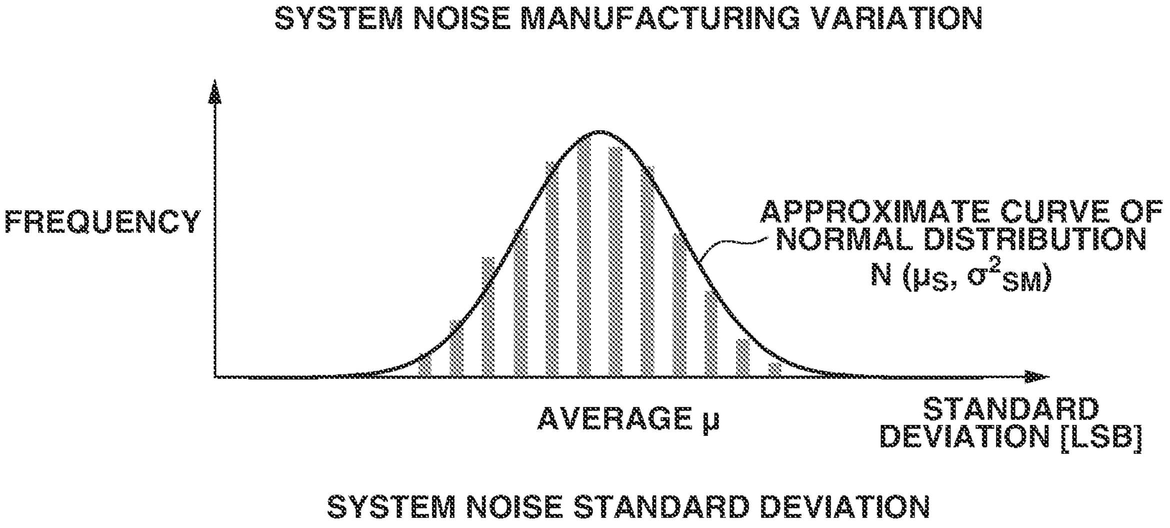
FIG. 5 is a schematic diagram illustrating a manufacturing variation of system noise of a radiation detector according to the first exemplary embodiment.

FIG. 5 illustrates an example of a manufacturing variation in a system noise characteristic of the radiation detector 10.

It is generally known that various characteristics are distributed by a manufacturing variation in accordance with a normal distribution. It can be seen that the standard deviation $\sigma_s$ of system noise of a radiation detector also has an individual difference following a substantially normal distribution.

When a system noise characteristic variation follows a normal distribution with an average s and a variance $\sigma_s{}^2{}_M$, the manufacturing variation analysis unit 263 employs a configuration of calculating the artificial system noise sNoise represented by equation (4), by distributing the variance of system noise at the frequency following the normal distribution with the average s and the variance $\sigma_s{}^2{}_M$ each time the processing in step S402 is performed. In other words, the manufacturing variation analysis unit 263 can generate and add noise simulating system noise of a radiation imaging apparatus in accordance with a distribution that is based on a manufacturing variation of a radiation imaging apparatus. In particular, it is possible to generate and add noise simulating system noise in accordance with a distribution of a variation of a system noise characteristic that is generated by a manufacturing variation of a radiation imaging apparatus. It is also possible to add noise simulating system noise at the frequency following a distribution calculated based on an average and a variance of a variation of a system noise characteristic. The average s and the variance $\sigma_s{}^2{}_M$ can be calculated from a preliminarily-obtained manufacturing record. In other words, it is possible to generate noise simulating system noise in accordance with statistical information regarding system noise that is obtained based on a manufacturing record of a radiation imaging apparatus.

The artificial quantum noise qNoise in equation (4) is a characteristic obtained based on the sensitivity of the radiation detector 10, an MTF, and the intensity of radiation input to the radiation detector 10, as described above. Similarly to system noise, the characteristics of sensitivity and an MTF of the fluorescent member have variations following a normal distribution due to a manufacturing variation. Thus, a characteristic value is selected at random from the normal distribution each time the processing in step S402 is performed, and the selected characteristic value is used as a parameter for creating artificial noise. In other words, it is possible to generate noise including high-frequency components attenuated in accordance with a distribution of a characteristic of an MTF of a fluorescent member included in a radiation imaging apparatus that is generated by a manufacturing variation of the radiation imaging apparatus. It is also possible to add noise including high-frequency components attenuated at the frequency following a distribution calculated from an average and a variance of a variation of the characteristic of the MTF of the fluorescent member. Furthermore, it is possible to add noise including high-frequency components attenuated in accordance with the characteristic of an MTF selected at random from a range determined in the distribution. It is desirable to define a fixed range as the range of a manufacturing variation by defining a maximum and a minimum value on the premise of a general Six Sigma, or selecting a value within a standard value defined as a product for each characteristic.

By employing the above-described configuration, it is possible to create artificial noise that takes into account an individual difference attributed to a manufacturing variation, and it becomes possible to execute learning for reduction.

As for the above-described individual difference attributed to a manufacturing variation, in a case where radiation detectors 10 with different models have substantially-equivalent characteristics, such as product groups being different only in an area of an imaging plane, and having substantially-equivalent design in the remaining parts, for example, a configuration that takes into account a manufacturing variation including a difference in model may be employed. In other words, noise may be created in accordance with statistical information obtained based on a manufacturing record of a plurality of manufactured radiation imaging apparatuses of one model. Alternatively, noise may be created in accordance with statistical information obtained based on a manufacturing record of a plurality of manufactured imaging apparatuses of different models.

A configuration that further takes into account the following in-plane characteristic variation within an individual product in addition to the above-described individual difference attributed to a manufacturing variation may be employed.

An imaging plane of the radiation detector 10 has a wide area (for example, approximately 43 cm×43 cm). It is therefore difficult to manufacture a product having a uniform characteristic throughout the plane, and a small difference in characteristic is sometimes generated in the plane of the same individual product.

Figure 6:
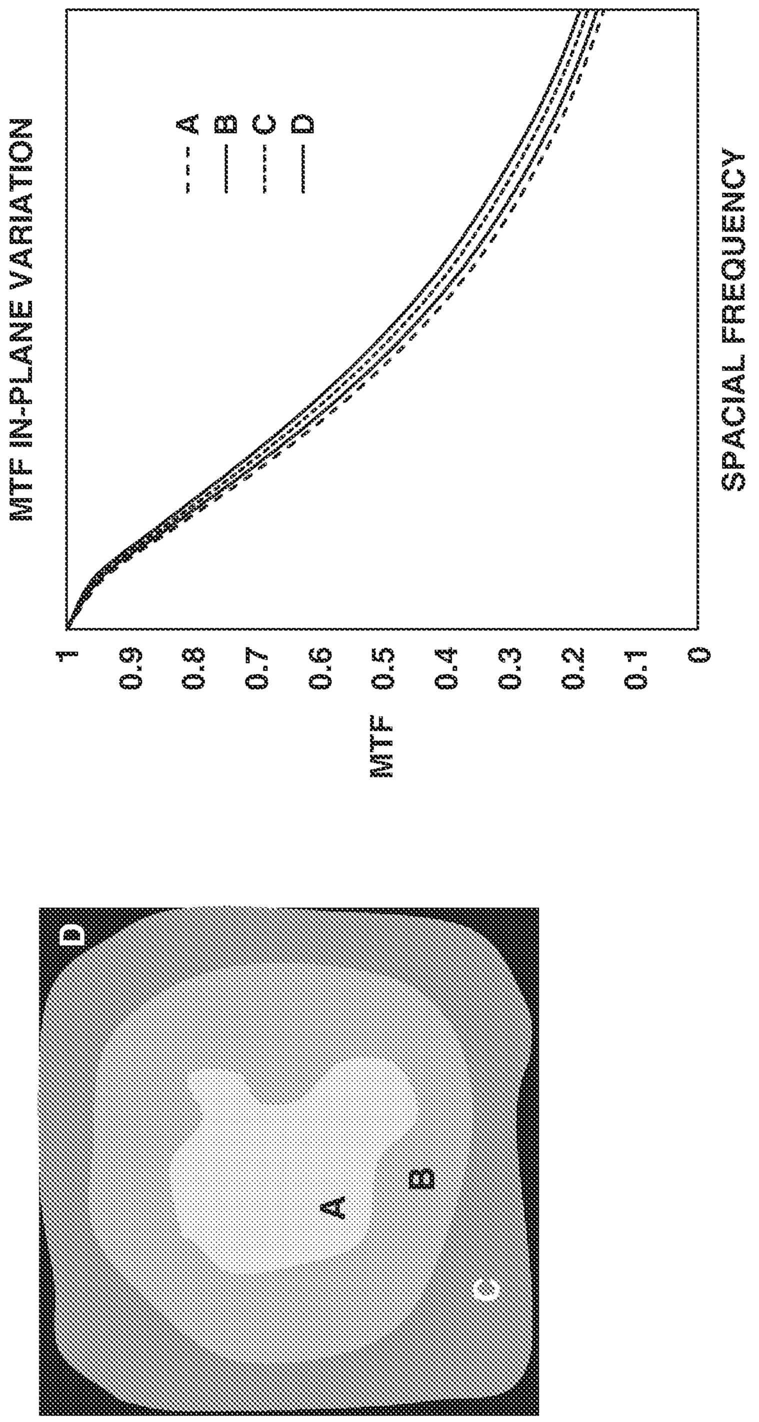
FIG. 6 is a schematic diagram illustrating a manufacturing variation of a modulation transfer function (MTF) of a radiation detector according to the first exemplary embodiment.

FIG. 6 is a diagram illustrating an example of an in-plane distribution of an MTF characteristic of the radiation detector 10. Due to a forming process of a fluorescent member, it is difficult to make the film thickness of the fluorescent member uniform, and an MTF sometimes becomes nonuniform in the plane. For example, the MTF becomes lower in a center part (A) in which the fluorescent member is thick, and the MTF becomes higher in an end part (D) in which the fluorescent member is thin. To cope with such a variation, a maximum value and a minimum value of an MTF in the plane of the fluorescent member are measured, and when artificial noise to be added is created, a value from the maximum value to the minimum value is selected at random each time the processing in step S402 is performed. In a case where a standard value as a product is defined for each characteristic, a value in the standard value may be selected. The characteristics are not limited to the MTF described in this example. In a case where a system noise characteristic or sensitivity has similar tendency, a similar configuration can be employed. In other words, it is possible to add noise simulating system noise in accordance with a variation in system noise characteristic selected at random from a range determined in a distribution.

In step S403, the learning data generation unit 264 adds artificial noise to input data of learning data. In this step, the learning data generation unit 264 performs addition based on artificial noise that takes into account a manufacturing variation calculated by the manufacturing variation analysis unit 263 in step S402.

In step S404, appropriate preprocessing is performed on a set of learning data. The method of the preprocessing is not limited to the above-described method. For example, in noise reduction processing, by performing square-root transformation or logarithmic transformation, for example, it is possible to use processing of making quantum noise following a Poisson distribution substantially-constant irrespective of the intensity of radiation to be input, and converting noise in such a manner that additive noise can be handled, or processing of setting an average value to 0. The method is not limited to this. Appropriate preprocessing can be performed in accordance with the type of image processing. For example, data may be normalized at 0-1, or standardization may be performed in such a manner that an average value becomes 0 and a standard deviation becomes 1.

In step S405, the inference processing unit 262 performs inference processing that uses a machine learning model, on input data of learning data, and outputs inference data to which noise reduction processing has been applied.

In step S406, the parameter update unit 265 compares inference data and ground truth, and calculates a loss function indicating a numerical value representing a difference between the both data pieces. Based on the loss function, parameters of a machine learning model (for example, a filter coefficient of a convolution layer in the CNN, etc.) are updated. Examples of the loss function include an average absolute error (L1loss) and an average square error (L2loss).

In step S407, end determination of learning is performed. In a case where it is determined that learning is to be ended (YES in step S407), the flow ends. In a case where it is determined that learning is not to be ended (NO in step S407), the processing returns to step S401, and the flow of the processing in steps S401 to S406 is repeated using another piece of data. By resetting a random number used in the manufacturing variation analysis performed in step S402, for each loop, it is possible to learn a machine learning model adapted to a manufacturing variation. As the end determination, it may be determined whether the flow has been repeated a specific number of loop times, for example. Alternatively, it may be determined whether a loss function is smaller than or equal to a fixed value. Alternatively, it may be determined whether overlearning is performed. Alternatively, a peak signal to noise ratio (PSNR), which is an index indicating the performance of noise reduction in an inference image, or structural similarity (SSIM) may be evaluated, and it may be determined whether the performance has reached a sufficient level. In other words, an appropriate determination criterion generally used in machine learning can be used.

As described above, the learning processing unit 261 according to the present exemplary embodiment adds artificial noise simulating the feature of noise in an actual radiation image, while taking into account a manufacturing variation. With this configuration, it becomes possible to generate a machine learning model that can output an image including desirably-reduced noise, even in a case where characteristics of a learning system and an inference system do not match, when processing based on a machine learning technique is applied to products having a manufacturing variation incidental to mass production.

(Inference Processing Unit)

Figure 7:
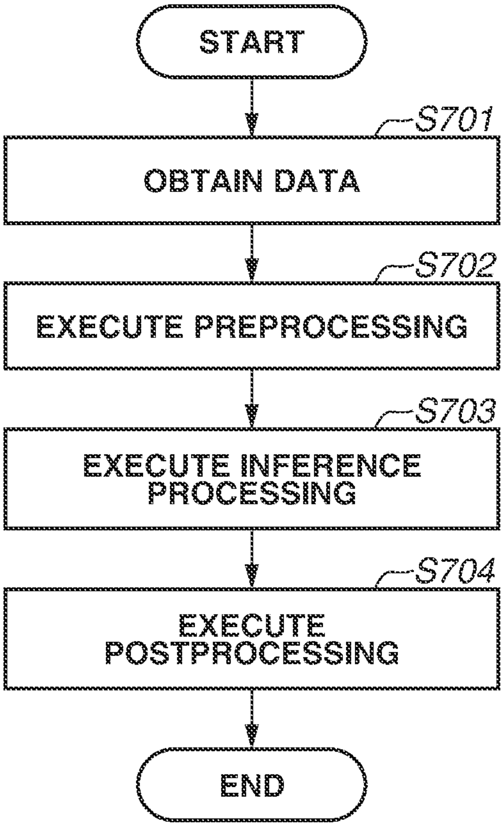
FIG. 7 is a flowchart illustrating an example of inference processing according to the first exemplary embodiment.

Next, a flow of processing executed by the inference processing unit 262 according to the present exemplary embodiment will be described with reference to FIG. 7. FIG. 7 is a flowchart illustrating a series of image processing to be executed by the inference processing unit 262 according to the present exemplary embodiment.

In a series of image processing according to the present exemplary embodiment, preprocessing is performed on a radiation image targeted by the processing, and the radiation image is input to a learned model. Then, postprocessing corresponding to preprocessing is performed on an output from the learned model, and a noise-reduced radiation image corresponding to the original radiation image is generated.

If a series of image processing according to the present exemplary embodiment is started, in step S701, the obtaining unit 21 obtains a radiation image. The obtaining unit 21 may obtain a radiation image generated by the radiation detector 10, or may obtain a radiation image from the storage unit 25 or the external storage device 70.

In step S702, preprocessing is performed. The same preprocessing as the preprocessing in step S404 in learning processing is performed.

In step S703, the inference processing unit 262 generates a noise-reduced image by performing inference processing using a learned model obtained by learning processing. The learned model is only required to be a preliminarily-learned machine learning model, and learning needs not be performed each time the series of image processing is performed. By blending an input image and a noise-reduced image obtained by performing inference processing, at a specific ratio, it is possible to adjust the strength of noise reduction processing.

The inference processing unit 262 may be an example of a generation unit that generates a second radiation image including reduced noise as compared with a first radiation image, by inputting the first radiation image to a learned model obtained by performing learning after selecting a radiation image to be used as learning data, based on at least either information of information regarding a signal included in a radiation image or information regarding noise. Alternatively, the inference processing unit 262 may be an example of a generation unit that generates a second radiation image including reduced noise as compared with a first radiation image, by inputting the first radiation image to a learned model obtained by performing learning after selecting learning data based on information regarding noise estimated within a range of a predetermined signal amount. Furthermore, the inference processing unit 262 may be an example of a generation unit that generates a second radiation image including reduced noise as compared with a first radiation image, by inputting the first radiation image to a learned model obtained by performing learning after selecting learning data based on a ratio between system noise included in a radiation image that is estimated within a range of a predetermined signal amount and quantum noise including a high-frequency component attenuated in accordance with a modulation transfer function of a fluorescent member included in a radiation detector. At this time, the learned model is only required to be a preliminarily-learned machine learning model, and learning needs not be performed each time the series of image processing is performed. By blending an input image and a noise-reduced image obtained by performing inference processing, at a specific ratio, it is possible to adjust the strength of noise reduction processing. Alternatively, the inference processing unit 262 may be an example of a generation unit that generates a blended image in which a first radiation image and a second radiation image including reduced noise as compared with the first radiation image are blended at a predetermined ratio.

In the present exemplary embodiment, a learned model is provided in the control unit 20, but the learned model may be provided in the external storage device 70 connected to the control unit 20.

In step S704, postprocessing corresponding to the preprocessing performed in step S702 is performed. As the postprocessing, inverse processing of transformation such as normalization or leveling performed in the preprocessing is performed. By the above-described processing in steps S701 to S704, it becomes possible to output a noise-reduced radiation image. In a case where the entire image cannot be processed at a time, due to the performance of the image processing unit 22, the image may be processed after being divided into small regions (e.g., 256×256 pixels) of an appropriate size.

In this manner, in the series of image processing according to the present exemplary embodiment, by performing the processing of the inference processing unit 262 using a learned model created by the learning processing unit 261, it is possible to generate a radiation image on which desirable noise reduction has been performed in a digital radiation imaging apparatus.

Furthermore, the learning processing unit 261 according to the present exemplary embodiment can take into account a manufacturing variation using the manufacturing variation analysis unit 263. Thus, it becomes possible to output an image including desirably-reduced noise, even in a case where characteristics of a learning system and an inference system do not match, when processing based on a machine learning technique is applied to products having a manufacturing variation incidental to mass production.

Figure 8:
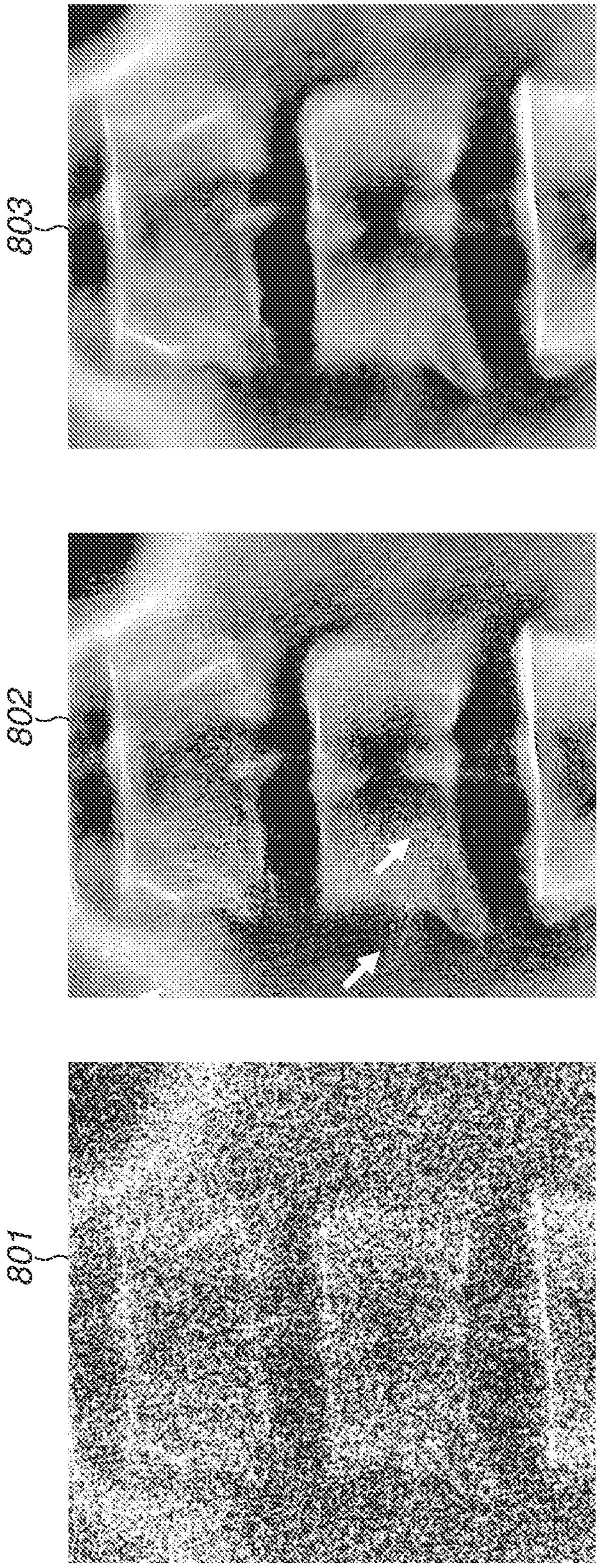
FIG. 8 is a diagram illustrating an example of images captured before and after image processing according to the first exemplary embodiment.

FIG. 8 is a diagram illustrating an example of a radiation image obtained before performing a series of image processing according to the present exemplary embodiment and a radiation image obtained after the processing. FIG. 8 exemplifies a result obtained in a case where noise reduction processing is applied by the noise reduction processing unit 26 to an input radiation image 801. In a noise-reduced radiation image 802 obtained in a case where countermeasures for a manufacturing variation are not performed and characteristics of a learning system and an inference system do not match, artifact like noise is generated. On the other hand, in a noise-reduced radiation image 803 obtained in a case where countermeasures for a manufacturing variation in this disclosure are performed, it can be seen that desirable noise reduction has been executed without the generation of artifact.

(Modified Example of Learning Processing)

In the above-described exemplary embodiments, a configuration of ensuring redundancy for a manufacturing variation by reflecting the influence of a manufacturing variation analyzed by the manufacturing variation analysis unit 263, in artificial noise to be added by the learning data generation unit 264, adding the artificial noise, and performing learning has been employed.

Nevertheless, as another exemplary embodiment, the following configuration can also be employed.

In this exemplary embodiment, a configuration of separately handling the influence of a manufacturing variation analyzed by the manufacturing variation analysis unit 263, and applying the influence as a regularization term of a loss function in parameter update processing is employed. In other words, a configuration of adding a change in characteristic of an imaging apparatus that is generated by a manufacturing variation of the imaging apparatus, as a regularization term in learning may be employed.

A loss function L can be represented by equation (5), for example, $$L = \sum_{i=1}^{n} \frac{|{}^{\circ} f_{netStudy}(I_{in}(i)) - I_{ans}(i)|}{n} + \lambda \sum_{i=1}^{n} |w(i)^{\circ}|^{\circ}, \tag{5}$$

where $f_{netstudy}$ denotes inference processing that uses a network being learned, $I_{in}$ denotes artificial noise addition-added input data, $I_{ans}$ denotes ground truth, and w denotes a regularization parameter.

$I_{in}(i)$ denotes a value of an i-th pixel of an image $I_{in}$, and the number of pixels of the image is n. The regularization parameter w is a term determined based on a variation in characteristic that is attributed to a manufacturing variation as illustrated in FIGS. 5 and 6.

Also in the above-described configuration, it becomes possible to generate a machine learning model that can output an image including desirably-reduced noise, when processing based on a machine learning technique is applied to products having a manufacturing variation incidental to mass production.

Figure 9:
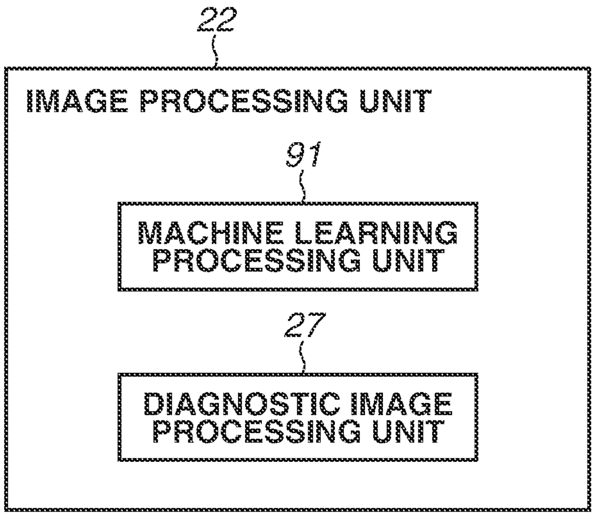
FIG. 9 is a diagram illustrating an example of a schematic configuration of a control unit according to a second exemplary embodiment.

As image processing, noise reduction processing on radiation images has been described so far, but processing to be targeted by learning in the present invention is not limited to noise reduction processing on radiation images. In other words, any image processing can be applied as long as the image processing can be implemented by machine learning that uses appropriate ground truth. In the image processing unit 22 in the configuration illustrated in FIGS. 1A, 1B, 2A, and 2B, a configuration including an arbitrary machine learning processing unit 91 as illustrated in FIG. 9 can be employed. The other configurations are the same as those described so far with reference to FIGS. 1A, 1B, 2A, and 2B.

Figure 10:
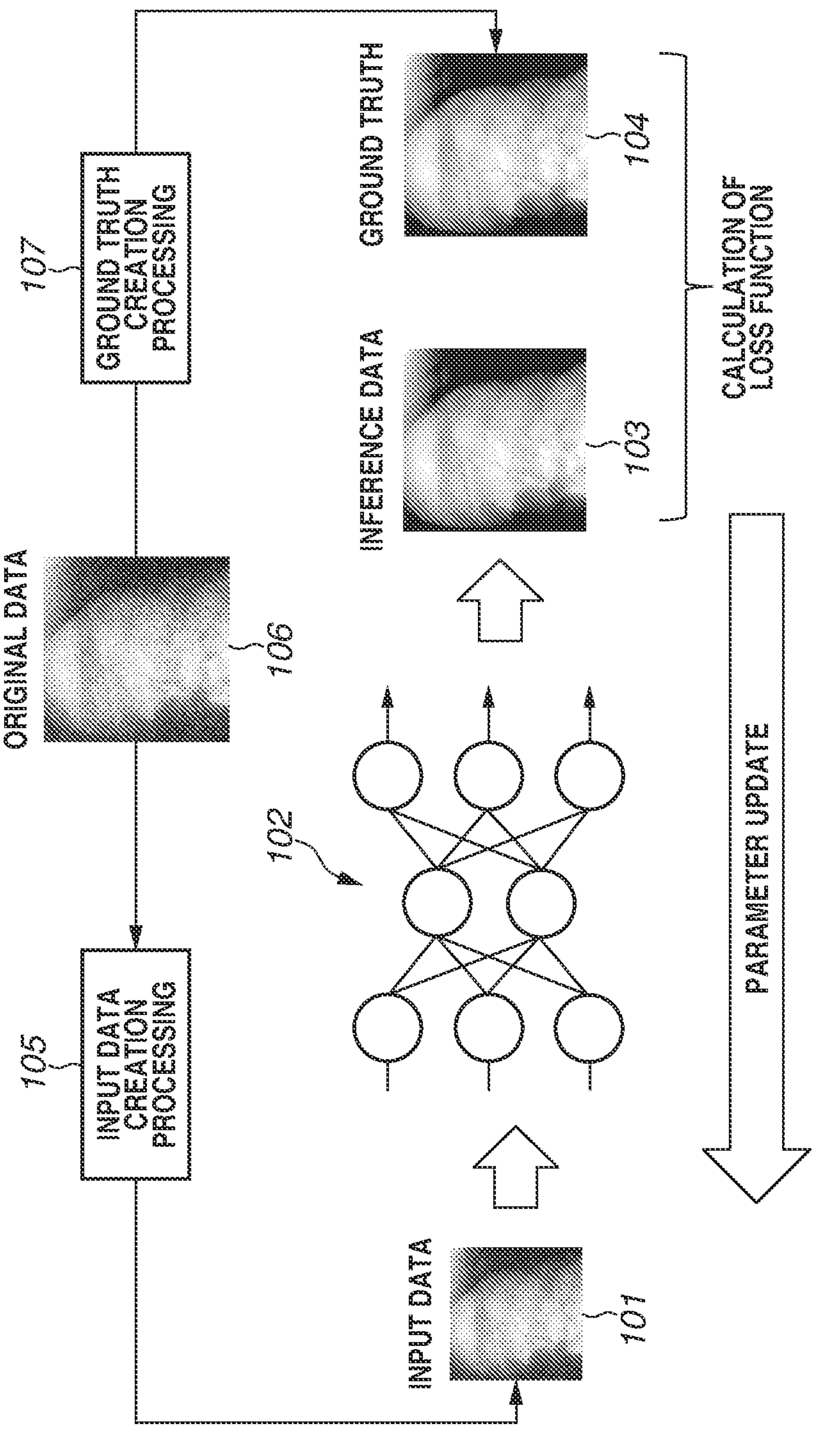
FIG. 10 is a diagram illustrating an example of a schematic configuration of a learned model according to the second exemplary embodiment.

Hereinafter, as an exemplary embodiment in another machine learning processing, a configuration in super-resolution processing will be described with reference to FIG. 10. FIG. 10 illustrates a schematic configuration example in learning of a neural network model of machine learning according to a second exemplary embodiment.

In this example, a set of low-resolution data and high-resolution data is treated as learning data. A set of learning data is generated from original data 106 by performing input data creation processing 106 (processing of decreasing the resolution of the original data 106) and ground truth creation processing 107 by the learning data generation unit 264.

Processing of applying a neural network model 102 of the inference processing unit 262 to low-resolution input data 101 in learning data, calculating a loss function from resolution-enhanced inference data 103 and ground truth 104 in learning data, and updating parameters of the schematic configuration 33 of the CNN based on the loss function is performed. The loss function represents a difference between the inference data 103 and the ground truth 104.

In the super-resolution processing, learning for reproducing high-resolution data from low-resolution data is performed. The resolution of data to be input varies depending on a manufacturing variation. To cope with this, the manufacturing variation analysis unit 263 analyzes the above-described variation in resolution, and reflects the variation in the processing of the learning data generation unit 264. For example, a configuration of creating a space filter for changing the resolution within a range assumed to be a manufacturing variation, at the time of creation of the input data 101 in the input data creation processing 105 and at the time of creation of the ground truth 104 in the ground truth creation processing 107, and performing resolution adjustment processing of original data is employed. In other words, learning data including radiation images resolution of which has been adjusted using a space filter generated based on a manufacturing variation of a radiation imaging apparatus is generated. With this configuration, inference processing that uses a learned neural network can be performed similarly to the processing illustrated in FIG. 7.

As described above, also in the super-resolution processing, it becomes possible to generate a machine learning model that can output an image with desirably-restored resolution, even in a case where characteristics of a learning system and an inference system do not match among products having a manufacturing variation incidental to mass production.

As another example, the machine learning processing unit 91 can be applied to arbitrary machine learning processing such as various types of segmentation processing, frequency enhancement processing, and image style transformation represented by a night mode of a camera. Characteristics varying due to a manufacturing variation are not limited to the resolution of a fluorescent member or a lens, noise characteristics, and sensitivity, which have been described so far. For example, arbitrary characteristics of various devices such as coloring characteristics, the number and locations of defective pixels, a voltage value and a dark current value in device operation, and an individual difference of circuit components can be handled.

Third exemplary embodiment will now be described. In the prior art, while a desirable effect can be obtained by noise reduction processing to which a machine learning technique is applied, performance sometimes varies depending on learning data (a set of input data and ground truth) used in learning. Especially when images including a large amount of noise are used as ground truth, a noise-existing state is learned as ground truth. Thus, a desirable noise reduction effect has failed to be obtained in some cases.

The present invention has been devised in view of the above-described drawbacks, and the present invention is directed to applying noise reduction processing to a radiation image.

The object of the present invention is not limited to the above-described object. As one of other objects, the present invention is directed to the production of functional effects that are to be derived from configurations to be described below in the following exemplary embodiments, which cannot be obtained by the prior art.

The configuration of a radiography system according to the present exemplary embodiment, the configuration of a control unit, the configuration of a machine learning model, and a flow of processing to be executed by the inference processing unit 262 may be similar to those in the above-described various exemplary embodiments. The above-described manufacturing variation analysis unit 263 can also function as a learning data selection unit in the present exemplary embodiment.

(Learning Processing)

Figure 11:
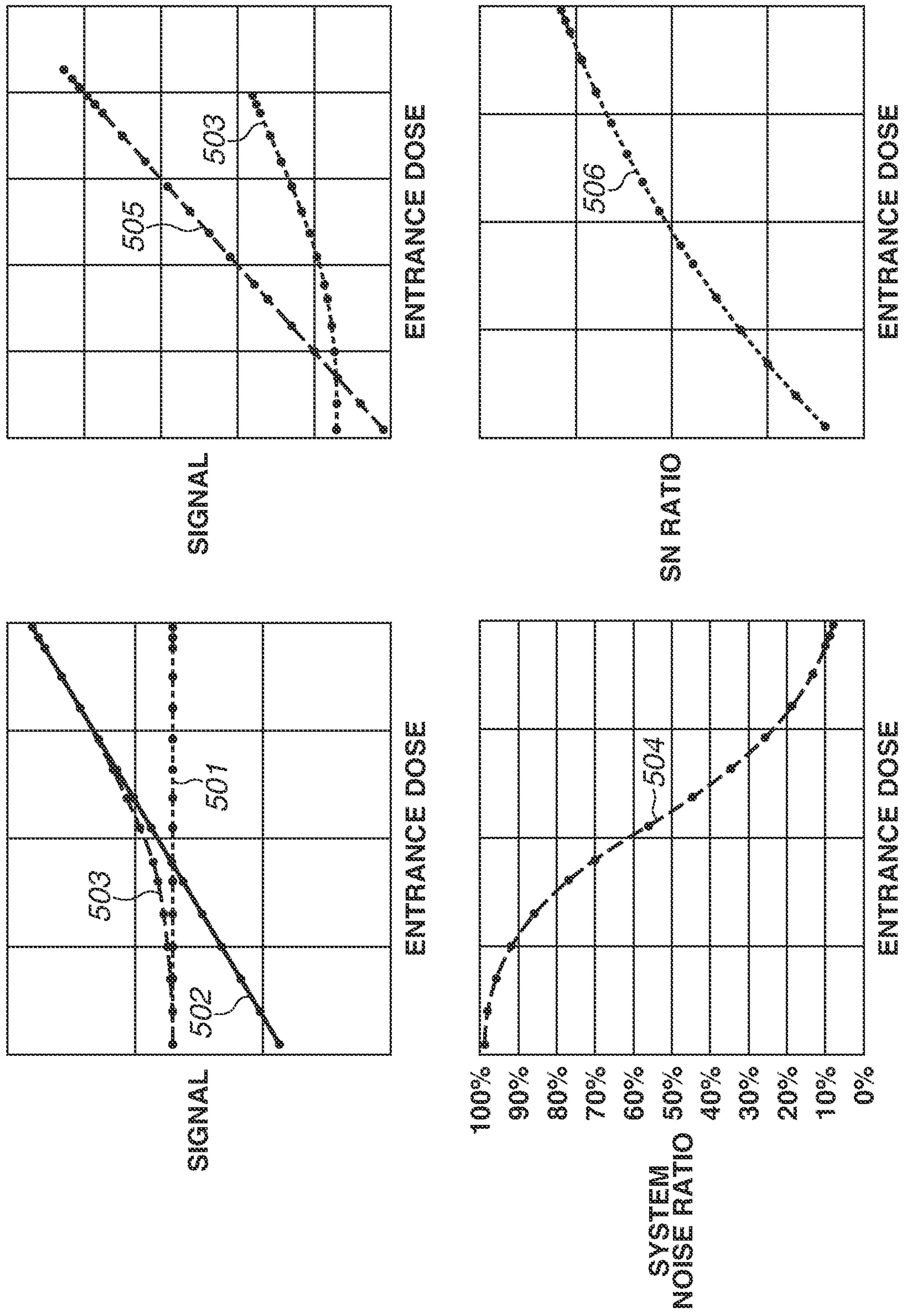
FIG. 11 is a diagram illustrating a relationship between an entrance dose, and a system noise, a quantum noise, a total noise, a signal, and a system noise ratio of a radiation detector according to a third exemplary embodiment.

Noise included in radiation images can be observed by measuring a standard deviation as a fluctuation of signals, and is broadly divided into quantum noise mainly generated due to a fluctuation of radiation quanta and system noise generated from a detector and a circuit. Because the radiation detector 10 has a configuration of converting radiation into visible light using the fluorescent member 11, it is known that high-frequency attenuation occurs in a signal of radiation in accordance with a modulation transfer function (MTF) defined by the resolution of the fluorescent member 11. Also in quantum noise generated due to a fluctuation of radiation quanta, high-frequency attenuation occurs in accordance with a similar MTF. In other words, quantum noise corresponds to an example of noise in which high-frequency components have attenuated. On the other hand, system noise generated from a detector and a circuit is not affected by the fluorescent member 11. Noise included in a radiation image is obtained by adding system noise independent of a dose in image capturing and quantum noise varying depending on a dose in image capturing, and a ratio between both types of noise becomes a ratio as illustrated in FIG. 11. While the influence of system noise becomes large and noise includes many high-frequency components in images captured under low dose, quantum noise predominates in images captured under high dose. Noise therefore has a frequency characteristic following an MTF of the fluorescent member. FIG. 11 illustrates a graph indicating a relationship between an entrance dose and a noise amount, and a system noise ratio. System noise 501 is constant with respect to a dose, and quantum noise 502 increases in proportion to a dose. A noise total 503 obtained by adding system noise and quantum noise becomes noise appearing in an actual image. A system noise ratio 504 with respect to the noise total has a characteristic of varying in relation to an entrance dose in a sigmoid manner, and rapidly varying in a specific dose region. A signal 505 with respect to an entrance dose is proportional to an entrance dose. By calculating a ratio between the signal 505 and the noise total 503, a signal noise ratio 506 (hereinafter, referred to as an SN ratio) is obtained. A signal increases in proportion to an entrance dose, but a rate of increase in noise is lower than a rate of increase in signal. The SN ratio therefore has a characteristic of getting higher as an entrance dose gets higher.

The system noise 501, the quantum noise 502, the noise total 503, the system noise ratio 504 with respect to the noise total, the signal 505, and the signal noise ratio 506, which have been described above, are physical characteristic values defined approximately uniquely with relation to an entrance dose based on the characteristics of the radiation detector 10.

An image with a high SN ratio refers to an image having a high proportion of a region in which an entrance dose and a signal are large, and an SN ratio is high.

In a case where images including a large amount of noise are used as ground truth, two problems arise.

One problem lies in that, because an SN ratio of ground truth is low, the obtaining of a desirable noise reduction effect sometimes fails if learning is performed using a noise-existing state as ground truth.

The other problem lies in that, because a ratio between system noise and quantum noise rapidly varies in a specific dose region, a relationship between a dose and a frequency characteristic of noise that varies with relation to a dose is destroyed depending on the characteristic of noise to be added to input data, and the feature of noise to be reduced cannot be learned properly in some cases.

To cope with the above-described issue, it is desirable to use an image with as high an SN ratio as possible, as ground truth. In other words, it is desirable to use, as learning data, a set of a radiation image including noise and serving as input data, and a radiation image substantially not including noise and serving as ground truth. The radiation image substantially not including noise can be obtained by a method of cancelling noise components uncorrelated with signals, by generating an average image by performing averaging processing of radiation images obtained by performing image capturing of the same inspection target object a plurality of times, for example. In a case where image capturing of the same inspection target object is performed a plurality of times, in view of invasiveness of radiation, it is desirable to target a phantom simulating a human body. The method for obtaining a radiation image substantially not including noise is an example, and is not limited to the above-described method. For example, a configuration of obtaining a radiation image substantially not including noise, by performing various types of noise reduction processing may be employed.

In view of the foregoing, a flow of processing to be executed by the learning processing unit 261 according to the present exemplary embodiment will be described with reference to FIG. 4. In step S401 in the present exemplary embodiment, the selection of a signal amount may be performed instead of the obtaining of the above-described learning data. In step S402 in the present exemplary embodiment, the selection of learning data may be performed instead of the analysis of the above-described manufacturing variation. The processing in steps S403 to S407 may be similar to the above-described processing in the respective steps.

First of all, in step S401 in the present exemplary embodiment, a range of a signal amount to be learned is selected. The range to be selected in this step is an arbitrary range to be selected at random within a dynamic range of signals manageable by the radiation detector 10. For example, in a case where the radiation detector 10 is a sensor that can manage 16-bit signals, a value range from 0 to 65535 is selected at random. In other words, the learning processing unit 261 corresponds to an example of a determination unit that determines a range of a signal amount to be learned. This also corresponds to an operation of selecting a system noise ratio in the radiation detector 10 illustrated in FIG. 11.

In step S402 in the present exemplary embodiment, the selection of learning data is performed by a learning data selection unit (manufacturing variation analysis unit 263). Learning data suitable for the learning of the signal amount range selected in step S401 in the present exemplary embodiment is selected from the obtained learning data.

The obtaining of learning data is performed by the obtaining unit 21, and an appropriate radiation image is obtained as learning data. The obtaining unit 21 may obtain a radiation image stored in the storage unit 25, or may obtain a radiation image from the external storage device 70. In addition, the obtaining unit 21 may obtain a radiation image output by the radiation detector 10.

The following description will be given of an example in which learning data to be selected switches in accordance with a system noise ratio in a selected signal amount range. In other words, the following description will be given of an example in which the learning of a learner is performed using learning data selected based on a ratio between system noise included in a radiation image that is estimated within a determined range of a signal amount, and quantum noise including a high-frequency component attenuated in accordance with an MTF of a fluorescent member included in a radiation detector that detects radiation.

Information to be used in switching of learning data to be selected needs not be always a system noise ratio. For example, because a system noise ratio is correlated with a dose in radiation imaging as described above, information regarding a dose may be used as information to be used in switching of learning data to be selected. Alternatively, both of a system noise ratio and information regarding a dose may be used. In other words, the learning data selection unit (manufacturing variation analysis unit 263) can select learning data based on at least either information of information regarding a signal included in a radiation image or information regarding noise. The information regarding the signal may include at least any one piece of information of information regarding a dose in radiation imaging, an amount of a signal included in a radiation image, or information regarding a ratio between a signal and noise included in the radiation image as described above, for example. In addition, the information regarding noise may include at least any one piece of information of a ratio between system noise and quantum noise, a noise amount of system noise, or a noise amount of quantum noise, for example.

In step S402 in the present exemplary embodiment, in a case where the ratio of the system noise is greater than or equal to a threshold value, the learning data selection unit (manufacturing variation analysis unit 263) selects an image with a high SN ratio and then uses an image adjusted to a signal amount range. In other words, in a case where the ratio of the system noise is higher than a threshold value, the learning data selection unit (manufacturing variation analysis unit 263) can use, as the learning data, a radiation image with a signal noise ratio higher than a signal noise ratio estimated within the selected range of the signal amount. In addition, in a case where the ratio of the system noise is smaller than or equal to a threshold value, the learning data selection unit uses an image existing within the selected signal range, as-is. In other words, in a case where the ratio of the system noise is lower than a threshold value, the learning data selection unit (manufacturing variation analysis unit 263) can use, as the learning data, a radiation image with a signal noise ratio estimated within the selected range of the signal amount.

In a case where the entire image cannot be processed at a time, due to the performance of the image processing unit 22, the image may be processed after being divided into regions of interest (ROI) with an appropriate size (e.g., 256×256 pixels). In a case where a pixel value distribution of ROI is wide, an image is selected in such a manner that the minimum value does not fall below the minimum value of the signal amount range.

The threshold value of the ratio of the system noise is only required to be defined based on the performance of the radiation detector 10, or performance target of noise reduction processing that is to be learned. Thus, the threshold value can be experimentally adjusted in accordance with performance target of noise reduction processing that is to be learned (for example, a signal noise ratio set as a goal in an image obtained by performing noise reduction processing using a learner).

As the image with a high SN ratio, an image captured under high dose, or an average image obtained by averaging a plurality of phantom images obtained by performing image capturing of a phantom simulating a human body a plurality of times can be used. In other words, in a case where the ratio of the system noise is higher than a threshold value, the learning data selection unit (manufacturing variation analysis unit 263) can use, as the learning data, an average image obtained by averaging a plurality of phantom images obtained by performing image capturing of a phantom simulating a human body a plurality of times. In addition, an image including an attenuated signal may be used by multiplying a selected image by an arbitrary coefficient.

In step S403 in the present exemplary embodiment, artificial noise is added to learning data by the learning data generation unit 264. First of all, artificial noise to be added in a case where the ratio of the system noise is smaller than or equal to a threshold value and an image existing within the selected signal range is used as-is in step S402 in the present exemplary embodiment will be described. In other words, in a case where the ratio of the system noise is lower than a threshold value, a radiation image with a signal noise ratio estimated within the selected range of the signal amount and a radiation image obtained by adding artificial noise simulating system noise and quantum noise to the radiation image are used as learning data. Also in the present exemplary embodiment, similarly to the above-described exemplary embodiments, noise obtaining by combining white noise corresponding to system noise of the radiation detector 10 and quantum noise affected by the MTF of the fluorescent member 11 is treated as artificial noise. A combined ratio of quantum noise and system noise may also be similar to that in the above-described exemplary embodiments.

Next, artificial noise to be added in a case where the ratio of the system noise is greater than or equal to a threshold value, and an image with a high exposure dose and a high SN ratio is selected and then an image adjusted to a signal amount range is used in step S402 will be described.

An adjusted signal $I_{decay}$ and a standard deviation $\sigma_{decay}$ of noise can be expressed as:

$$I_{decay}=I_{ori}\times\alpha \quad (6A),$$

$$\sigma_{decay}=\sigma_{ori}\times\alpha \quad (6B),$$

where $I_{ori}$ denotes a signal in an original radiation image and a standard deviation $\sigma_{ori}$ denotes noise included in an image, and a signal amount is adjusted by uniformly multiplying all pixels of the image by α.

At this time, noise is added to the signal $I_{decay}$ in such a manner that noise becomes similar to noise included in a case where an image is captured under a dose that generates an intended signal $I_{decay}$. In other words, artificial noise is estimated in such a manner that a ratio between system noise and quantum noise in a radiation image to which artificial noise is added becomes equal to a ratio between system noise and quantum noise in a radiation image with a signal noise ratio higher than a signal noise ratio estimated with the selected range of the signal amount, and the estimated artificial noise is added to the radiation image.

A standard deviation $\sigma_{sysADD}$ of system noise sNoise' to be added as artificial noise, and standard deviation $\sigma_{qADD}$ of quantum noise qNoise' can be expressed as:

$$\sigma_{sysADD}=\sqrt{(1-\alpha^2)}\sigma_{sysORI} \quad (7)$$

$$\sigma_{qADD}=\sqrt{(\sigma qTARGET-(\alpha\sigma_{qORI})^2)} \quad (8),$$

where $\sigma_{qORI}$ denotes a standard deviation of quantum noise in an original image, $\sigma_{sysORI}$ denotes a standard deviation of system noise, and $\sigma_{qTARGET}$ denotes a standard deviation of noise assumed to exist in the adjusted signal $I_{decay}$, from the characteristic of the radiation detector 10. Here, a frequency characteristic of the quantum noise qNoise' to be added as artificial noise has a noise power spectrum (NPS) following the MTF of the fluorescent member 11. At this time, artificial noise (addNoise') to be added can be expressed as:

$$addNoise'=B\times(sNoise'+qNoise') \quad (9),$$

where B denotes an arbitrary coefficient and it is normally desirable to set B=1, but in a case where a noise reduction effect is desired to be changed, it is possible to adjust a noise addition amount by varying the coefficient B.

In a case where an average image obtained by performing image capturing of a phantom simulating a human body a plurality of times is used, or in a case where an SN ratio of a used image is good enough, noise represented by equation (4) may be simply added assuming that noise is sufficiently small.

In the present exemplary embodiment, the description has been given of an example in which artificial noise to be added is switched between noise represented by equation (4) and noise represented by equation (9), in accordance with the ratio of the system noise, but learning can be performed using noise represented by equation (9), in all cases.

Learning data in the present exemplary embodiment uses the above-described radiation images as input data and ground truth. After the above-described radiation images are input to the learning processing unit 261 as the same data, appropriate artificial noise is added to input data or input data and ground truth in the learning processing unit 261. A difference is thereby generated between the input data and the ground truth.

FIG. 8 is a diagram illustrating an example of a radiation image obtained before image processing is executed by the inference processing unit 262 according to the present exemplary embodiment, and a radiation image obtained after the processing. FIG. 8 exemplifies a result obtained in a case where noise reduction processing is applied by the noise reduction processing unit 26 to an input radiation image 801. In a radiation image 803 having been subjected to a series of image processing according to the present exemplary embodiment, it can be seen that noise included in the radiation image 801 is reduced, and an inspection target object included the radiation image is clearly shown.

Fourth exemplary embodiment will now be described. In the above-described third exemplary embodiment, an example of adjusting a signal amount of an image captured under a high dose and an example of a phantom image have been described as examples of an image with a high SN ratio. As another exemplary embodiment, the following configuration can also be employed. In the present exemplary embodiment, to prepare an image with a high SN ratio, a configuration using appropriate noise reduction processing is employed. The configurations similar to those in the above-described exemplary embodiments may be employed as the other configurations. At this time, in a case where the ratio of the system noise is higher than a threshold value, the learning processing unit 261 according to the present exemplary embodiment can perform noise reduction processing on a radiation image. Then, the learning processing unit 261 can use, as the learning data, a radiation image having been subjected to noise reduction processing, and a radiation image obtained by adding artificial noise simulating system noise and quantum noise, to the radiation image having been subjected to noise reduction processing.

A flow of processing to be executed by the learning processing unit 261 according to the present exemplary embodiment will be described with reference to FIG. 4. In step S401 in the present exemplary embodiment, the selection of learning data may be performed instead of the obtaining of the above-described learning data. In step S402 in the present exemplary embodiment, noise reduction processing may be performed instead of the analysis of the above-described manufacturing variation. The processing in steps S403 to S407 may be similar to the above-described processing in the respective steps.

First of all, in step S401 in the present exemplary embodiment, learning data is input to the learning processing unit 261. The obtaining of learning data to be input is performed by the obtaining unit 21. In the present exemplary embodiment, an appropriate radiation image is obtained as learning data. The obtaining unit 21 may obtain a radiation image stored in the storage unit 25, or may obtain a radiation image from the external storage device 70. In addition, the obtaining unit 21 may obtain a radiation image output by the radiation detector 10. Learning data in the present exemplary embodiment is data including the above-described radiation images as input data and ground truth. After the above-described radiation images are input to the learning processing unit 261 as the same data, appropriate artificial noise is added to input data or input data and ground truth in the learning processing unit 261. A difference is thereby generated between the input data and the ground truth.

In step S402 in the present exemplary embodiment, processing of increasing an SN ratio of an image is performed by performing appropriate noise reduction processing on learning data. As noise reduction processing to be performed in this step, any noise reduction processing known so far may be used, or a result of noise reduction processing described in another exemplary embodiment can also be used.

By employing the above-described configuration, even in a case where learning data includes an image with a low SN ratio, it becomes possible to perform learning of noise reduction processing in a state where an SN ratio is increased. It is therefore possible to generate a machine learning model that can output a radiation image including desirably-reduced noise.

Figure 12:
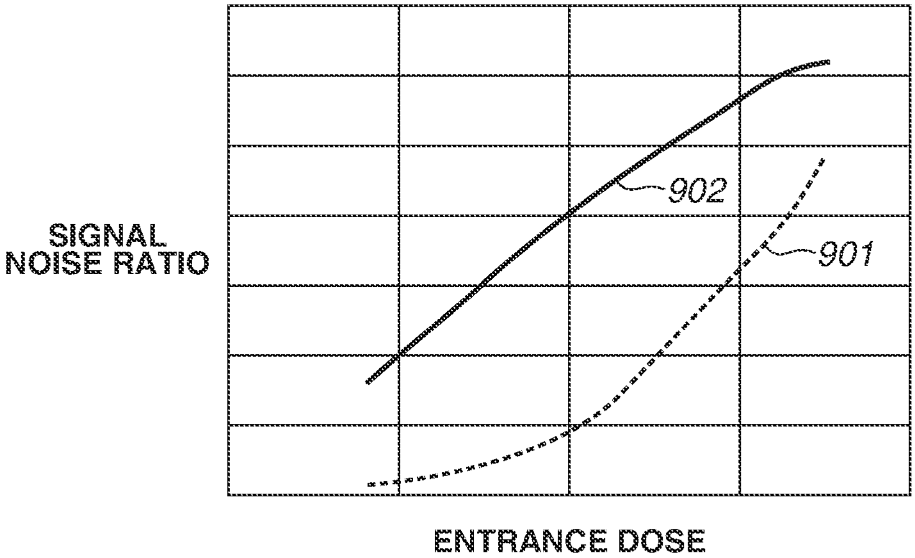
FIG. 12 is a diagram illustrating an entrance dose and a target system noise ratio of a noise reduction processing unit according to a fifth exemplary embodiment.

As a fifth exemplary embodiment, the following configuration can also be employed. When noise reduction processing based on machine learning is constructed, it is possible to adjust an effect of the noise reduction processing in accordance with learning data to be used. FIG. 12 illustrates, with relation to an entrance dose, an SN ratio 901 obtained in a case where noise reduction is not performed and an SN ratio 902 set as a goal of noise reduction processing that is to be learned.

For example, in medical radiation images, it is desirable to drastically increase an SN ratio in a low dose region in which a signal amount is small and the visibility of a subject is bad. Nevertheless, in a high dose region in which the signal amount is sufficient, because the visibility of a subject is sufficiently ensured, it is sometimes desirable to perform adjustment in such a manner as to reduce influence exerted on signals, by reducing the effect of noise reduction instead of drastically increasing an SN ratio.

The learning processing unit 261 can employ a configuration of performing learning while selecting learning data suitable for the SN ratio 902 set as a goal of noise reduction processing that is to be learned, using the learning data selection unit (manufacturing variation analysis unit 263), by combining the methods of adjusting an SN ratio in the exemplary embodiments described so far.

In view of the foregoing, a flow of processing to be executed by the learning processing unit 261 according to the present exemplary embodiment will be described with reference to FIG. 4. The configurations similar to those in the above-described exemplary embodiments are employed as the other configurations. In step S401 in the present exemplary embodiment, the selection of a signal amount may be performed instead of the obtaining of the above-described learning data. In step S402 in the present exemplary embodiment, the selection and adjustment of learning data may be performed instead of the analysis of the above-described manufacturing variation. The processing in steps S403 to S407 may be similar to the above-described processing in the respective steps.

First, in step S401 in the present exemplary embodiment, a range of a signal amount to be learned is selected. The range to be selected in this step is an arbitrary range to be selected at random within a dynamic range of signals manageable by the radiation detector 10. For example, in a case where the radiation detector 10 is a sensor that can manage 16-bit signals, a value range from 0 to 65535 is selected at random. This also corresponds to an operation of selecting a system noise ratio in the radiation detector 10 illustrated in FIG. 11 and the SN ratio 902 set as a goal of noise reduction processing to be learned illustrated in FIG. 12.

In step S402, the selection of learning data is performed by the learning data selection unit (manufacturing variation analysis unit 263). Learning data suitable for the learning of the signal amount range selected in step S401 is selected from the obtained learning data.

The obtaining of learning data is performed by the obtaining unit 21, and an appropriate radiation image is obtained as learning data. The obtaining unit 21 may obtain a radiation image stored in the storage unit 25, or may obtain a radiation image from the external storage device 70. In addition, the obtaining unit 21 may obtain a radiation image output by the radiation detector 10.

The learning data to be selected is selected in accordance with the SN ratio 902 set as a goal of noise reduction processing to be learned illustrated in FIG. 12. The selection of data is performed using a method described in another exemplary embodiment, or any combination thereof. For example, a clinical image may be used as-is. Alternatively, an average image obtained by performing image capturing of a phantom simulating a human body a plurality of times may be used. After an image with a high SN ratio is selected, an image adjusted to a signal amount range may be used. In addition, additional noise reduction processing may be applied. Alternatively, by using a blended image of these arbitrary images, learning data can be appropriately selected in accordance with the SN ratio 902 set as a goal of noise reduction processing that is to be learned and the characteristic of learning data in possession. In other words, by appropriately selecting images to be used as learning data, it is possible to adjust an SN ratio realized by noise reduction using a learner. For example, it is possible to use learning data obtained by combining an average image obtained by averaging a plurality of phantom images, and an image obtained by adding artificial noise to the average image, a clinical image with a signal noise ratio greater than or equal to a predetermined value obtained by capturing an image of a human body, and a radiation image obtained by adding artificial noise to a radiation image with a signal noise ratio greater than or equal to a predetermined value, in accordance with the SN ratio 902 set as a goal of noise reduction processing that is to be learned. Furthermore, learning data further including a noise-reduced image obtained by performing noise reduction processing on a clinical image, and an image obtained by adding artificial noise to the noise-reduced image may be used. For example, a clinical image and a noise-reduced image may be combined in accordance with an SN ratio set as a goal. In other words, at least one image of the average image, the clinical image, or the noise-reduced image can be selected in accordance with the SN ratio 902 set as a goal of noise reduction processing using a learner, and learning of the learner can be performed using the selected image. The above-described blending of arbitrary images can be based on the system noise ratio 504 in FIG. 11. For example, in a case where the ratio of the system noise is smaller than or equal to a threshold value, a clinical image is used as-is. That is, a combination of images to be used in learning may be varied between learning of noise reduction of an image with a relatively-high system noise ratio that has been captured under a low dose, and learning of noise reduction of an image with a relatively-low system noise ratio that has been captured under a high dose. The number of threshold values for varying a combination of images to be used in learning needs not be always one. Two or more threshold values may be set and an image may be appropriately selected in the range of each threshold value.

In step S403 in the present exemplary embodiment, artificial noise is added to learning data by the learning data generation unit 264. As for artificial noise to be added, in a case where an image with a high SN ratio is selected and then an image adjusted to a signal amount range is used, in accordance with the image generated in step S402 in the present exemplary embodiment, noise represented by equation (9) is appropriately blended as artificial noise to be added, and in other cases, noise represented by equation (4) is appropriately blended as artificial noise to be added.

Learning data in the present exemplary embodiment is data including the above-described radiation images as input data and ground truth. After the above-described radiation images are input to the learning processing unit 261 as the same data, appropriate artificial noise is added to input data or input data and ground truth in the learning processing unit 261. A difference is thereby generated between the input data and the ground truth.

By employing the above-described configuration, even in a case where learning data includes an image with a low SN ratio, it becomes possible to perform learning of noise reduction processing in a state where an SN ratio is increased. Furthermore, by defining an SN ratio set as a goal, for each dose, and selecting optimum learning data, it is possible to generate a machine learning model that can implement noise reduction processing an effect of which is desirably optimized for each dose.

Modified Example 1

As for a machine learning model used by a calculation processing unit 266, arbitrary layer configurations such as a variational auto-encoder (VAE), a fully convolutional network (FCN), SegNet, or DenseNet can be used in combination as the configuration of the CNN. In addition, for example, a capsule network (CapsNet) may be used. In a general neural network, by being configured to output a scalar value, each unit (each neuron or each node) is configured to reduce space information regarding a spatial positional relationship (relative position) between features in an image, for example. With this configuration, for example, it is possible to perform learning that reduces the influence of local distortion or parallel translation of an image. On the other hand, in the capsule network, by being configured to output space information as a vector, each unit (each capsule) is configured to hold space information, for example. With this configuration, for example, it is possible to perform learning that takes into account spatial positional relationship (relative position) between features in an image.

Modified Example 2

Learning data of various learned models is not limited to data obtained using a radiation detector that performs actual image capturing, and may be data obtained using a radiation detector of the same model, or may be data obtained using a radiation detector of the same type, depending on a desired configuration. The learned model for noise reduction processing according to the above-described exemplary embodiments and modified examples is used in estimation processing related to the generation of a noise-reduced radiation image, by extracting the magnitude of a luminance value of a radiation image, an order and inclination of a bright portion and a dark portion, a position, distribution, continuousness as a part of feature amounts, for example.

The learned model for noise reduction processing according to the above-described exemplary embodiments and modified examples can be provided in the control unit 20. The learned model may be implemented by a software module to be executed by a processor such as a CPU, an MPU, a GPU, or an FPGA, for example, or may be implemented by a circuit having a specific function, such as an ASIC. These learned models may be provided in an apparatus of another server connected with the control unit 20. In this case, the control unit 20 can use the learned models by connecting to the server including the learned models, via an arbitrary network such as the Internet. The server including the learned models may be a cloud server, a fog server, or an edge server, for example.

The disclosure of the present exemplary embodiment includes configurations and methods of the following additional statements.

Additional Statement 1

The present exemplary embodiment may be an image processing apparatus including an obtaining unit configured to obtain a first radiation image of an inspection target object, and a generation unit configured to generate a second radiation image including reduced noise as compared with the first radiation image, by inputting the first radiation image obtained by the obtaining unit, to a learned model obtained by performing learning after selecting a radiation image to be used as learning data, based on at least either information of information regarding a signal included in a radiation image or information regarding noise.

Additional Statement 2

The present exemplary embodiment may be an image processing apparatus, in which the information regarding the signal includes at least any one piece of information of information regarding a dose in radiation imaging, an amount of a signal included in a radiation image, or information regarding a ratio between a signal and noise included in the radiation image.

Additional Statement 3

The present exemplary embodiment may be an image processing apparatus, in which the information regarding noise includes at least any one piece of information of a ratio between system noise included in a radiation image and quantum noise including a high-frequency component attenuated in accordance with a modulation transfer function of a fluorescent member included in a radiation detector that detects radiation, a noise amount of the system noise, or a noise amount of the quantum noise.

Additional Statement 4

The present exemplary embodiment may be an image processing apparatus, in which the generation unit generates the second radiation image by inputting the first radiation image to a learned model obtained by performing learning after selecting learning data based on the information regarding noise estimated within a range of a predetermined signal amount.

Additional Statement 5

The present exemplary embodiment may be an image processing apparatus, in which the generation unit generates the second radiation image by inputting the first radiation image to a learned model obtained by performing learning after selecting learning data based on a ratio between system noise included in a radiation image that is estimated within the range of the signal amount and quantum noise including a high-frequency component attenuated in accordance with a modulation transfer function of a fluorescent member included in a radiation detector.

Additional Statement 6

The present exemplary embodiment may be an image processing apparatus, in which, in a case where the ratio of the system noise is higher than a threshold value, the generation unit generates the second radiation image by inputting the first radiation image to a learned model obtained by performing learning using, as the learning data, a radiation image with a signal noise ratio higher than a signal noise ratio estimated within the range of the signal amount.

Additional Statement 7

The present exemplary embodiment may be an image processing apparatus, in which, in a case where the ratio of the system noise is lower than a threshold value, the generation unit generates the second radiation image by inputting the first radiation image to a learned model obtained by performing learning using, as the learning data, a radiation image with a signal noise ratio estimated within the range of the signal amount.

Additional Statement 8

The present exemplary embodiment may be an image processing apparatus, in which the generation unit generates a blended image in which the first radiation image and the second radiation image are blended at a predetermined ratio.

Additional Statement 9

The present exemplary embodiment may be a learning apparatus including a learning unit configured to perform learning of a learner using learning data selected based on at least either information of information regarding a signal included in a radiation image or information regarding noise.

Additional Statement 10

The present exemplary embodiment may be a learning apparatus further including a determination unit configured to determine a range of a signal amount to be learned, in which the learning unit performs learning of the learner using learning data selected based on the information regarding noise estimated within the determined range of the signal amount.

Additional Statement 11

The present exemplary embodiment may be a learning apparatus, in which the learning unit performs learning of a learner using learning data selected based on a ratio between system noise included in a radiation image that is estimated within the determined range of the signal amount and quantum noise including a high-frequency component attenuated in accordance with a modulation transfer function of a fluorescent member included in a radiation detector that detects radiation.

Additional Statement 12

The present exemplary embodiment may be a learning apparatus, in which the learning data includes a radiation image and a radiation image obtained by adding artificial noise simulating the system noise and the quantum noise to the radiation image, and the learning unit adjusts the artificial noise to be added to the radiation image based on the ratio of the system noise.

Additional Statement 13

The present exemplary embodiment may be a learning apparatus, in which the learning unit estimates artificial noise in such a manner that a ratio between system noise and quantum noise in the radiation image to which the artificial noise is added becomes equal to a ratio between the system noise and the quantum noise in a radiation image with a signal noise ratio higher than a signal noise ratio estimated within the range of the signal amount, and adds the estimated artificial noise to a radiation image.

Additional Statement 14

The present exemplary embodiment may be a learning apparatus, in which, in a case where the ratio of the system noise is higher than a threshold value, the learning unit uses, as the learning data, a radiation image with a signal noise ratio higher than a signal noise ratio estimated within the range of the signal amount.

Additional Statement 15

The present exemplary embodiment may be a learning apparatus, in which, in a case where the ratio of the system noise is higher than a threshold value, the learning unit uses, as the learning data, an average image obtained by averaging a plurality of phantom images obtained by performing image capturing of a phantom simulating a human body a plurality of times.

Additional Statement 16

The present exemplary embodiment may be a learning apparatus, in which the learning unit uses, as the learning data, a radiation image with a signal noise ratio higher than a signal noise ratio estimated within the range of the signal amount, and a radiation image obtained by adding artificial noise simulating the system noise and the quantum noise to the radiation image.

Additional Statement 17

The present exemplary embodiment may be a learning apparatus, in which, in a case where the ratio of the system noise is lower than a threshold value, the learning unit uses, as the learning data, a radiation image with a signal noise ratio estimated within the range of the signal amount.

Additional Statement 18

The present exemplary embodiment may be a learning apparatus, in which the learning unit uses, as the learning data, a radiation image with a signal noise ratio estimated within the range of the signal amount, and a radiation image obtained by adding artificial noise simulating the system noise and the quantum noise to the radiation image.

Additional Statement 19

The present exemplary embodiment may be a learning apparatus further including a processing unit configured to perform noise reduction processing on a radiation image in a case where the ratio of the system noise is higher than a threshold value, in which the learning unit uses, as the learning data, the radiation image having been subjected to the noise reduction processing and a radiation image obtained by adding artificial noise simulating the system noise and the quantum noise to the radiation image having been subjected to the noise reduction processing.

Additional Statement 20

The present exemplary embodiment may be a learning apparatus including a learning unit configured to perform learning of a learner for reducing noise of a radiation image, using learning data including an average image obtained by averaging a plurality of phantom images obtained by performing image capturing of a phantom simulating a human body a plurality of times, and an image obtained by adding artificial noise simulating system noise included in a radiation image and quantum noise including a high-frequency component attenuated in accordance with a modulation transfer function of a fluorescent member included in a radiation detector, to the average image, a clinical image with a signal noise ratio greater than or equal to a predetermined value obtained by capturing an image of a human body, and an image obtained by adding artificial noise simulating the system noise and the quantum noise to the clinical image.

Additional Statement 21

The present exemplary embodiment may be a learning apparatus, in which the learning unit performs learning of a learner using learning data further including a noise-reduced image obtained by performing noise reduction processing on the clinical image, and an image obtained by adding artificial noise simulating the system noise and the quantum noise to the noise-reduced image.

Additional Statement 22

The present exemplary embodiment may be a learning apparatus, in which the learning unit selects at least one image of the average image, the clinical image, or the noise-reduced image in accordance with a signal noise ratio set as a goal of noise reduction processing using the learner, and performs learning of the learner using selected image.

Additional Statement 23

The present exemplary embodiment may be a learning apparatus including a learning unit configured to learn a learned model using learning data including a radiation image to which noise is added in accordance with statistical information obtained based on a manufacturing record of a radiation imaging apparatus.

Additional Statement 24

The present exemplary embodiment may be a learning apparatus for performing machine learning of a learned model for performing image processing on an image captured by an imaging apparatus, the learning apparatus including a learning unit configured to add a change in a characteristic of the imaging apparatus generated by a manufacturing variation of the imaging apparatus as a regularization term in learning of the learned model.

Additional Statement 25

The present exemplary embodiment may be a generation method of learning data, including generating learning data including an average image obtained by averaging a plurality of phantom images obtained by performing image capturing of a phantom simulating a human body a plurality of times, and an image obtained by adding artificial noise simulating system noise included in a radiation image and quantum noise including a high-frequency component attenuated in accordance with a modulation transfer function (MTF) of a fluorescent member included in a radiation detector, to the average image, a radiation image with a signal noise ratio greater than or equal to a predetermined value obtained by capturing an image of a human body, and a radiation image obtained by adding artificial noise simulating the system noise and the quantum noise, to a radiation image with a signal noise ratio greater than or equal to the predetermined value.

Additional Statement 26

The present exemplary embodiment may be a generation method of learning data, in which the generating generates learning data further including a noise-reduced image obtained by performing noise reduction processing on the clinical image, and an image obtained by adding artificial noise simulating the system noise and the quantum noise to the noise-reduced image.

Additional Statement 27

The present exemplary embodiment may be a generation method of learning data, including generating learning data including a radiation image to which noise is added in accordance with statistical information obtained based on a manufacturing record of a radiation imaging apparatus.

Additional Statement 28

The present exemplary embodiment may be a generation method of learning data, further including analyzing a manufacturing variation of a characteristic regarding noise of the radiation imaging apparatus from the manufacturing record, in which the generating generates learning data including a radiation image to which noise is added in accordance with the statistical information obtained based on the manufacturing variation of the characteristic regarding noise that has been analyzed in the analyzing.

Additional Statement 29

The present exemplary embodiment may be a generation method of learning data, in which the characteristic regarding the noise includes a system noise characteristic of the radiation imaging apparatus, sensitivity of the radiation imaging apparatus, and a characteristic of an MTF of a fluorescent member included in the radiation imaging apparatus, and the analyzing analyzes at least any one manufacturing variation of a system noise characteristic of the radiation imaging apparatus, sensitivity of the radiation imaging apparatus, or a characteristic of an MTF of a fluorescent member included in the radiation imaging apparatus.

Additional Statement 30

The present exemplary embodiment may be an image processing method including obtaining a first radiation image of an inspection target object, and generating a second radiation image including reduced noise as compared with the first radiation image, by inputting the first radiation image obtained by the obtaining, to a learned model obtained by performing learning after selecting learning data based on at least either information of information regarding a signal included in a radiation image or information regarding noise.

Additional Statement 31

The present exemplary embodiment may be an image processing method including obtaining a first radiation image of an inspection target object that has been captured by a radiation imaging apparatus, and generating a second radiation image including reduced noise as compared with the first radiation image, by inputting the first radiation image obtained by the obtaining, to a learned model obtained by performing using learning data including a radiation image to which noise simulating system noise of a radiation imaging apparatus in accordance with a distribution based on a manufacturing variation of a radiation imaging apparatus is added.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-191531, filed Nov. 25, 2021, and No. 2021-191532, filed Nov. 25, 2021, which are hereby incorporated by reference herein in their entirety.

What is claimed is:

1. An image processing apparatus comprising:

at least one processor; and a memory coupled to the at least one processor, the memory having instructions that, when executed by the at least one processor, cause the at least one processor to function as:

an obtaining unit configured to obtain a first radiation image of an inspection target object that has been captured by a radiation imaging apparatus; and a generation unit configured to generate a second radiation image including noise reduced as compared with the first radiation image, by inputting the first radiation image obtained by the obtaining unit to a learned model obtained by performing learning using learning data including a radiation image to which noise simulating system noise of the radiation imaging apparatus and noise simulating a quantum noise included in radiation that have been obtained by using a distribution that is based on a manufacturing variation among radiation imaging apparatuses are added, wherein the noise simulating system noise is obtained by using a distribution indicating a variation among a plurality of system noise characteristics, that is generated by the manufacturing variation among the radiation imaging apparatuses, and being obtained by using an average and a variance of the plurality of system noise characteristics.

2. The image processing apparatus according to claim 1, wherein the generation unit obtains the noise simulating system noise by using a system noise characteristic selected at random from among the plurality of system noise characteristics.

3. The image processing apparatus according to claim 1, wherein the generation unit obtains the noise simulating the quantum noise by using a distribution indicating an in-plane characteristic variation of a modulation transfer function (MTF) of a fluorescent member arranged within the radiation imaging apparatus, the in-plane characteristic variation being generated based on the manufacturing variation among the radiation imaging apparatuses.

4. The image processing apparatus according to claim 3, wherein the generation unit obtains, as the noise simulating the quantum noise, noise in which a high-frequency component included in the quantum noise has been attenuated by using the distribution indicating the in-plane characteristic variation of the MTF.

5. The image processing apparatus according to claim 3, wherein the generation unit obtains the distribution indicating the in-plane characteristic variation of the MTF by using an average and a variance of a plurality of characteristics of the MTF.

6. The image processing apparatus according to claim 5, wherein the generation unit obtains the noise simulating the quantum noise by using a characteristic of the MTF selected at random from among the plurality of characteristics of the MTF.

7. The image processing apparatus according to claim 1, wherein the radiation imaging apparatuses are a plurality of manufactured radiation imaging apparatuses of one model, and wherein the generation unit obtains the distribution that is based on the manufacturing variation among the radiation imaging apparatuses by using statistical information obtained based on a manufacturing record of the plurality of manufactured radiation imaging apparatuses of the one model.

8. The image processing apparatus according to claim 1, wherein the radiation imaging apparatuses are a plurality of manufactured radiation imaging apparatuses of different models, and wherein the generation unit obtains the distribution that is based on the manufacturing variation among the radiation imaging apparatuses by using statistical information obtained based on a manufacturing record of the plurality of manufactured radiation imaging apparatuses of the different models.

9. An image processing method comprising:

obtaining a first radiation image of an inspection target object that has been captured by a radiation imaging apparatus; and generating a second radiation image including noise reduced as compared with the first radiation image, by inputting the obtained first radiation image to a learned model obtained by performing learning using learning data including a radiation image to which noise simulating system noise of the radiation imaging apparatus and noise simulating a quantum noise included in radiation that have been obtained by using a distribution that is based on a manufacturing variation among radiation imaging apparatuses are added, wherein the noise simulating the system noise is obtained by using a distribution indicating a variation among a plurality of system noise characteristics, that is generated by the manufacturing variation among the radiation imaging apparatuses, and being obtained by using an average and a variance of the plurality of system noise characteristics.

10. A non-transitory computer-readable medium storing a program for causing a computer to execute the image processing method according to claim 9.

* * * * *